United States Patent
Wohlwend et al.

(10) Patent No.: US 11,551,004 B2
(45) Date of Patent: Jan. 10, 2023

(54) INTENT DISCOVERY WITH A PROTOTYPE CLASSIFIER

(71) Applicant: ASAPP, INC., New York, NY (US)

(72) Inventors: Jeremy Elliot Azriel Wohlwend, New York, NY (US); Ethan Russell Elenberg, Jersey City, NJ (US); Samuel Andrew Altschul, New York, NY (US); Michael Griffiths, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 1094 days.

(21) Appl. No.: 16/189,584

(22) Filed: Nov. 13, 2018

(65) Prior Publication Data

US 2020/0151253 A1    May 14, 2020

(51) Int. Cl.
*G06F 40/30* (2020.01)
*G06K 9/62* (2022.01)
(Continued)

(52) U.S. Cl.
CPC ........... *G06F 40/30* (2020.01); *G06K 9/6269* (2013.01); *G06N 3/08* (2013.01); *G06Q 30/016* (2013.01);
(Continued)

(58) Field of Classification Search
CPC .......... G06F 40/30; G06K 9/62; G06Q 30/00; G06N 3/08; H04L 51/02
See application file for complete search history.

(56) References Cited

U.S. PATENT DOCUMENTS

| 5,195,034 A | 3/1993 | Garneau et al. |
| 5,227,971 A | 7/1993 | Nakajima et al. |

(Continued)

FOREIGN PATENT DOCUMENTS

| CN | 1633817 A | 6/2005 |
| CN | 105009556 A | 10/2015 |

(Continued)

OTHER PUBLICATIONS

U.S. Appl. No. 16/189,613, filed Nov. 13, 2018, Pending, Jeremy Elliot Azriel Wohlwend.
(Continued)

*Primary Examiner* — Yosef K Laekemariam
(74) *Attorney, Agent, or Firm* — GTC Law Group PC & Affiliates

(57) ABSTRACT

In some applications, it may be desired to process a message to determine an intent of the message, where the intent indicates the meaning of the message. An intent classifier may be used to determine the meaning of a message by processing the message to compute a message embedding vector that represents the message in a vector space. Each possible intent may be represented by a prototype vector, and the intent of the message may be determined by comparing the message embedding to one or more prototype vectors, such as by selecting an intent whose prototype vector is closest to the message embedding. An intent classifier may be used, for example, (i) to implement an automated communications system with states where each state is associated with a subset of the possible intents or (ii) for processing usage data of a communications system to update the intents of the communications system.

20 Claims, 11 Drawing Sheets

(51) Int. Cl.
*G06Q 30/00* (2012.01)
*G06N 3/08* (2006.01)
*H04L 51/02* (2022.01)

(52) U.S. Cl.
CPC .... *H04L 51/02* (2013.01); *G05B 2219/23002* (2013.01)

(56) References Cited

U.S. PATENT DOCUMENTS

| | | |
|---|---|---|
| 5,369,575 A | 11/1994 | Lamberti et al. |
| 6,173,279 B1 | 1/2001 | Levin et al. |
| 6,177,932 B1 | 1/2001 | Galdes et al. |
| 6,327,363 B1 | 12/2001 | Henderson et al. |
| 6,381,645 B1 | 4/2002 | Sassin et al. |
| 6,453,292 B2 | 9/2002 | Ramaswamy et al. |
| 6,915,254 B1 | 7/2005 | Heinze et al. |
| 6,981,040 B1 | 12/2005 | Konig et al. |
| 7,257,564 B2 | 8/2007 | Loughmiller et al. |
| 7,603,330 B2 | 10/2009 | Gupta et al. |
| 7,644,057 B2 | 1/2010 | Nelken et al. |
| 8,024,196 B1 | 9/2011 | Wodtke et al. |
| 8,054,951 B1 | 11/2011 | Winslow et al. |
| 8,156,138 B2 | 4/2012 | Kohn et al. |
| 8,271,403 B2 | 9/2012 | Rieck et al. |
| 8,494,152 B1 | 7/2013 | Roberts et al. |
| 8,577,671 B1 | 11/2013 | Barve et al. |
| 8,626,509 B2 | 1/2014 | Roy et al. |
| 9,043,197 B1 | 5/2015 | Pasca et al. |
| 9,336,269 B1 | 5/2016 | Smith et al. |
| 9,591,136 B1 | 3/2017 | Garcia et al. |
| 9,602,987 B1 | 3/2017 | Wittig |
| 9,715,496 B1 | 7/2017 | Sapoznik et al. |
| 9,723,151 B2 | 8/2017 | McGann et al. |
| 9,727,925 B2 | 8/2017 | Subramanian et al. |
| 9,742,916 B1 | 8/2017 | Christopher |
| 9,761,222 B1 | 9/2017 | Scarasso et al. |
| 9,762,733 B1 | 9/2017 | Ramanujaiaha et al. |
| 9,805,371 B1 | 10/2017 | Sapoznik et al. |
| 9,807,037 B1 | 10/2017 | Sapoznik et al. |
| 9,875,440 B1 | 1/2018 | Commons |
| 9,892,414 B1 | 2/2018 | Henry |
| 9,911,413 B1* | 3/2018 | Kumar ................ G06F 40/169 |
| 10,049,663 B2 | 8/2018 | Orr et al. |
| 10,067,938 B2 | 9/2018 | Bellegarda |
| 10,083,451 B2 | 9/2018 | Sehrawat et al. |
| 10,083,690 B2 | 9/2018 | Giuli et al. |
| 10,089,072 B2 | 10/2018 | Piersol et al. |
| 10,097,690 B1 | 10/2018 | Henry |
| 10,109,275 B2 | 10/2018 | Henry |
| 10,127,908 B1 | 11/2018 | Deller et al. |
| 10,169,315 B1 | 1/2019 | Heckel et al. |
| 10,210,244 B1 | 2/2019 | Branavan et al. |
| 10,387,888 B2 | 8/2019 | Sapoznik et al. |
| 10,453,074 B2 | 10/2019 | Sapoznik et al. |
| 10,482,875 B2 | 11/2019 | Henry |
| 10,489,792 B2 | 11/2019 | Hackman et al. |
| 10,490,182 B1* | 11/2019 | Madhavaraj .......... G10L 15/063 |
| 10,497,004 B2 | 12/2019 | Shaev et al. |
| 2003/0033288 A1 | 2/2003 | Shanahan et al. |
| 2003/0033347 A1 | 2/2003 | Bolle et al. |
| 2003/0103621 A1 | 6/2003 | Brown et al. |
| 2004/0003283 A1 | 1/2004 | Goodman et al. |
| 2004/0254904 A1 | 12/2004 | Nelken et al. |
| 2005/0076084 A1 | 4/2005 | Loughmiller et al. |
| 2005/0105712 A1 | 5/2005 | Williams et al. |
| 2005/0228790 A1 | 10/2005 | Ronnewinkel et al. |
| 2006/0112127 A1 | 5/2006 | Krause et al. |
| 2006/0173776 A1 | 8/2006 | Shalley et al. |
| 2007/0094217 A1 | 4/2007 | Ronnewinkel et al. |
| 2007/0100618 A1 | 5/2007 | Lee et al. |
| 2007/0121899 A1 | 5/2007 | Galvin |
| 2007/0168448 A1 | 7/2007 | Garbow et al. |
| 2008/0091435 A1 | 4/2008 | Strope et al. |
| 2008/0112620 A1 | 5/2008 | Jiang |
| 2008/0168070 A1 | 7/2008 | Naphade et al. |
| 2008/0168135 A1 | 7/2008 | Redlich et al. |
| 2011/0066634 A1 | 3/2011 | Phillips et al. |
| 2011/0082825 A1 | 4/2011 | Sathish et al. |
| 2011/0093414 A1 | 4/2011 | Xu et al. |
| 2011/0173346 A1 | 7/2011 | Neben |
| 2011/0239113 A1 | 9/2011 | Hung et al. |
| 2011/0270771 A1 | 11/2011 | Coursimault et al. |
| 2011/0286596 A1 | 11/2011 | Gressel et al. |
| 2011/0314012 A1 | 12/2011 | Kenthapadi et al. |
| 2012/0005515 A1 | 1/2012 | Reddi et al. |
| 2012/0053945 A1 | 3/2012 | Gupta et al. |
| 2012/0102130 A1 | 4/2012 | Guyot et al. |
| 2012/0266258 A1 | 10/2012 | Tuchman et al. |
| 2013/0143587 A1 | 6/2013 | Williams et al. |
| 2013/0144605 A1 | 6/2013 | Brager et al. |
| 2013/0166485 A1 | 6/2013 | Hoffmann et al. |
| 2013/0173604 A1 | 7/2013 | Li et al. |
| 2013/0317808 A1 | 11/2013 | Kruel et al. |
| 2014/0047234 A1 | 2/2014 | Davis et al. |
| 2014/0075004 A1 | 3/2014 | Van Dusen et al. |
| 2014/0079195 A1 | 3/2014 | Srivastava et al. |
| 2014/0180788 A1 | 6/2014 | George et al. |
| 2014/0278379 A1 | 9/2014 | Coccaro et al. |
| 2014/0282138 A1 | 9/2014 | Hopton et al. |
| 2014/0297268 A1 | 10/2014 | Govrin et al. |
| 2014/0297281 A1 | 10/2014 | Togawa et al. |
| 2014/0317030 A1 | 10/2014 | Shen et al. |
| 2014/0330818 A1 | 11/2014 | Raina et al. |
| 2014/0365209 A1 | 12/2014 | Evermann |
| 2015/0006143 A1 | 1/2015 | Skiba et al. |
| 2015/0032724 A1 | 1/2015 | Thirugnanasundaram et al. |
| 2015/0033106 A1 | 1/2015 | Stetson et al. |
| 2015/0052002 A1 | 2/2015 | Welch et al. |
| 2015/0073798 A1 | 3/2015 | Karov et al. |
| 2015/0142704 A1 | 5/2015 | London |
| 2015/0149177 A1 | 5/2015 | Kalns et al. |
| 2015/0154285 A1 | 6/2015 | Saarinen et al. |
| 2015/0178390 A1 | 6/2015 | Torras |
| 2015/0215624 A1 | 7/2015 | Wei |
| 2015/0220833 A1 | 8/2015 | Le |
| 2015/0220995 A1 | 8/2015 | Guyot et al. |
| 2015/0228275 A1 | 8/2015 | Watanabe et al. |
| 2015/0242385 A1 | 8/2015 | Bao et al. |
| 2015/0310377 A1 | 10/2015 | Duval et al. |
| 2015/0340032 A1 | 11/2015 | Gruenstein |
| 2015/0363393 A1 | 12/2015 | Williams et al. |
| 2015/0365387 A1 | 12/2015 | Good |
| 2016/0019816 A1 | 1/2016 | Parry et al. |
| 2016/0063067 A1 | 3/2016 | Maitra et al. |
| 2016/0078456 A1 | 3/2016 | Chakraborty et al. |
| 2016/0092688 A1 | 3/2016 | Wolrich et al. |
| 2016/0163311 A1 | 6/2016 | Crook et al. |
| 2016/0163314 A1 | 6/2016 | Fujii et al. |
| 2016/0180151 A1 | 6/2016 | Philbin et al. |
| 2016/0180838 A1 | 6/2016 | Parada San Martin et al. |
| 2016/0182672 A1 | 6/2016 | Kuperman et al. |
| 2016/0239846 A1 | 8/2016 | Arvapally et al. |
| 2016/0247068 A1 | 8/2016 | Lin |
| 2016/0255034 A1 | 9/2016 | Yuan |
| 2016/0323398 A1 | 11/2016 | Guo et al. |
| 2016/0328388 A1 | 11/2016 | Cao et al. |
| 2016/0364522 A1 | 12/2016 | Frey et al. |
| 2017/0011279 A1 | 1/2017 | Soldevila et al. |
| 2017/0013073 A1 | 1/2017 | Mendez et al. |
| 2017/0060844 A1* | 3/2017 | He ..................... G06F 16/3331 |
| 2017/0091320 A1 | 3/2017 | Psota et al. |
| 2017/0103324 A1 | 4/2017 | Weston et al. |
| 2017/0116982 A1 | 4/2017 | Gelfenbeyn et al. |
| 2017/0147682 A1 | 5/2017 | Alaqeeli et al. |
| 2017/0148073 A1 | 5/2017 | Nomula et al. |
| 2017/0177712 A1* | 6/2017 | Kopru ................ G06F 16/3337 |
| 2017/0200077 A1 | 7/2017 | Weston et al. |
| 2017/0213138 A1 | 7/2017 | Bojja et al. |
| 2017/0308523 A1 | 10/2017 | Wang et al. |
| 2017/0323016 A1 | 11/2017 | Feng et al. |
| 2018/0005112 A1 | 1/2018 | Iso-Sipila et al. |
| 2018/0012231 A1 | 1/2018 | Sapoznik et al. |
| 2018/0012232 A1 | 1/2018 | Sehrawat et al. |
| 2018/0013699 A1 | 1/2018 | Sapoznik et al. |

(56) References Cited

U.S. PATENT DOCUMENTS

| | | |
|---|---|---|
| 2018/0018562 A1 | 1/2018 | Jung |
| 2018/0032755 A1 | 2/2018 | Odinak |
| 2018/0052664 A1 | 2/2018 | Zhang et al. |
| 2018/0068233 A1 | 3/2018 | Miranda et al. |
| 2018/0121738 A1 | 5/2018 | Womack et al. |
| 2018/0131645 A1 | 5/2018 | Magliozzi et al. |
| 2018/0143965 A1 | 5/2018 | Willson et al. |
| 2018/0174037 A1 | 6/2018 | Henry |
| 2018/0174579 A1 | 6/2018 | Henry |
| 2018/0181807 A1 | 6/2018 | Yankov |
| 2018/0203848 A1 | 7/2018 | Perez et al. |
| 2018/0232434 A1 | 8/2018 | Geyik et al. |
| 2018/0239830 A1 | 8/2018 | Dialani et al. |
| 2018/0253734 A1 | 9/2018 | Henry |
| 2018/0260680 A1* | 9/2018 | Finkelstein ............. G06N 5/04 |
| 2018/0329886 A1 | 11/2018 | Li et al. |
| 2018/0357439 A1 | 12/2018 | Osotio |
| 2018/0365702 A1 | 12/2018 | Sehrawat et al. |
| 2018/0376002 A1 | 12/2018 | Abraham |
| 2019/0019197 A1 | 1/2019 | Roberts et al. |
| 2019/0019503 A1 | 1/2019 | Henry |
| 2019/0122101 A1 | 4/2019 | Lei |
| 2019/0180288 A1 | 6/2019 | Shaev et al. |
| 2019/0182383 A1 | 6/2019 | Shaev et al. |
| 2019/0213601 A1 | 7/2019 | Hackman et al. |
| 2019/0311375 A1 | 10/2019 | Sapoznik et al. |
| 2019/0332658 A1 | 10/2019 | Heckel et al. |
| 2020/0019609 A1 | 1/2020 | Yu et al. |
| 2020/0042613 A1 | 2/2020 | Jiang et al. |
| 2020/0043015 A1 | 2/2020 | Shaev et al. |

FOREIGN PATENT DOCUMENTS

| | | | |
|---|---|---|---|
| WO | 2018009231 | A1 | 1/2018 |
| WO | 2018009432 | A1 | 1/2018 |
| WO | 2018160492 | A1 | 9/2018 |
| WO | 2019113409 | A1 | 6/2019 |
| WO | 2019113409 | A8 | 7/2019 |

OTHER PUBLICATIONS

"scikit-learn: Machine Learning in Python", scikit-learn 0.17.1 documentation, http://scikit-learn.org/stable/ (accessed on Sep. 20, 2016), 3 pages.

"Using algorithms for advanced customer care", Nokia Strategic white paper, https://resources.ext.nokia.com/asset/200614 (accessed Jul. 26, 2017), 2017, 11 pages.

16908347.4, , "European Application Serial No. 16908347.4, Extended European Search Report dated Nov. 20, 2019", ASAPP, Inc., 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J. , "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Cai, Lijuan et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.

Carrier, Pierre L. et al., "LSTM Networks for Sentiment Analysis", http://deeplearning.net/tutorial/lstm.html, accessed on Sep. 20, 2016, 5 pages.

Chandar, Sarath et al., "Correlational Neural Networks", CoRR abs/1504.07225, http://arxiv.org/abs/1504.07225, Oct. 12, 2015, 27 pages.

Chen, Mia X. et al., "Gmail Smart Compose: Real-Time Assisted Writing", arXiv:1906.00080v1 [cs.CL], https://arxiv.org/pdf/1906.00080.pdf (accessed on Mar. 25, 2020), May 17, 2019, 9 pages.

Chen, Wenlin et al., "Compressing Neural Networks with the Hashing Trick", arXiv:1504.04788v1, https://arxiv.org/pdf/1504.04788.pdf (accessed on Nov. 26, 2018), Apr. 19, 2015, 10 pages.

Chen, Yun-Nung et al., "An empirical investigation of sparse log-linear models for improved dialogue act classification", IEEE International Conference on Acoustics Speech and Signal Processing, 2013, XP032507868,, 6 pages.

Chen, Yun-Nung et al., "An empirical investigation of sparse log-linear models for improved dialogue act classification", 2013 IEEE International Conference on Acoustics. Speech and Signal Processing. IEEE., 2013, 6 pages.

Chen, Yun-Nung , "An empirical investigation of sparse log-linear models for improved dialogue act classification.", 2013 IEEE International Conference on Acoustics, Speech and Signal Processing. IEEE, 2013, pp. 1-6.

Cheng, Yong et al., "Semi-Supervised Learning for Neural Machine Translation", CoRR abs/1606.04596, http://arxiv.org/abs/1606.04596, Dec. 10, 2016, 10 pages.

Collados, Jose C. , "On the contribution of neural networks and word embeddings in Natural Language Processing", published at Medium.com, Jan. 2018. (Year: 2018), http://www.josecamachocollados.com, Jan. 2018, pp. 1-7.

Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

De La Briandais, Rene , "File Searching Using Variable Length Keys", Proceedings of the 1959 Western Joint Computer Conference, https://pdfs.semanticscholar.org/3ce3/f4cdc91d03850ed84ef96a08498e018d18f.pdf, 1959, pp. 295-298.

Deerwester, Scott et al., "Improving Information Retrieval with Latent Semantic Indexing", Proceedings of the 51st ASIS Annual Meeting (ASIS '88), vol. 25, Oct. 1988, pp. 36-40.

Deerwester, Scott et al., "Indexing by Latent Semantic Analysis", Journal of the Association for Information Science and Technology, vol. 41, iss. 6, Sep. 1990, pp. 391-407.

Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.

Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Goodfellow, Ian J. et al., "Generative Adversarial Nets", Advances in Neural Information Processing Systems 27 (NIPS 2014), https://papers.nips.cc/paper/5423-generative-adversarial-nets.pdf, 2014, pp. 2672-2680.

Gray, R. , "Vector quantization", IEEE ASSP Magazine, vol. 1, iss. 2 https://ieeexplore.ieee.org/document/1162229/ (abstract only), Apr. 1984, pp. 4-29.

(56) References Cited

OTHER PUBLICATIONS

Henderson, Matthew et al., "Efficient Natural Language Response Suggestion for Smart Reply", arXiv:1705.00652v1, https://arxiv.org/pdf/1705.00652.pdf (accessed Aug. 15, 2018), May 1, 2017, 15 pages.
Hochreiter, Sepp et al., "Long Short-Term Memory", Neural Computation, vol. 9, iss. 8, 1997, pp. 1735-1780.
Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.
Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.
Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.
Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.
Karpathy, Andrej, "The Unreasonable Effectiveness of Recurrent Neural Networks", http://karpathy.github.io/2015/05/21/rnn-effectiveness/, (accessed on Sep. 20, 2016), May 21, 2015, 42 pages.
Kim, Yoon et al., "Character-Aware Neural Language Models", CoRR abs/1508.06615, http://arxiv.org/abs/1508.06615, 2015, 9 pages.
Kim, Yoon, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kiros, Ryan et al., "Skip-Thought Vectors", Proceedings of the 28th International Conference on Neural Information Processing Systems, vol. 2., 2015, pp. 3294-3302.
Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.
Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Jan. 3, 2017), pp. 3270-3278.
Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.
Lample, Guillaume et al., "Unsupervised Machine Translation Using Monolingual Corpora Only", CoRR abs/1711.00043, http://arxiv.org/abs/1711.00043, Oct. 31, 2017, 12 pages.
Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Le, Quoc et al., "Distributed Representations of Sentences and Documents", Proceedings of the 31st International Conference on Machine Learning, W&CP vol. 32, Beijing, China, 2014, 9 pages.
Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.
Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.
Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing,Beijing, China, http://web.stanford.edu/~jurafsky/pubs/P15-1107.pdf, Jul. 26-31, 2015 (accessed on Jan. 3, 2017), pp. 1106-1115.
Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.
Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.
Logeswaran, Lajanugen et al., "An Efficient Framework for Learning Sentence Representations", International Conference on Learning Representations, https://openreview.net/pdf?id=rJvJXZb0W, 2018, 16 pages.
Logeswaran, Lajanugen et al., "An efficient framework for learning sentence representations", ICLR 2018 Conference Blind Submission, https://openreview.net/pdf?id=rJvJXZb0W (accessed Nov. 26, 2018), Feb. 15, 2018, 16 pages.
Miao, Yishu et al., "Neural Variational Inference for Text Processing", CoRR abs/1511.06038, http://arxiv.org/abs/1511.06038, 2015, 15 pages.
Mikolov, Tomas et al., "Distributed Representations of Words and Phrases and their Compositionality", CoRR abs/1310.4546, http://arxiv.org/abs/1310.4546, 2013, 9 pages.
Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.
Mikolov, Tomas et al., "Recurrent neural network based language model", Interspeech 2010, Sep. 26-30, 2010, Makuhari, Chiba, Japan, 2010, pp. 1045-1048.
Mikolov, Tomas et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.
Mühler, Vincent, "Building a Node.js WebSocket Chat App with Socket.io and React", Tutorial to Socket.io with JavaScript, Feb. 22, 2018, 12 pages.
Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.
PCT/US2016/049896, , "Application Serial No. PCT/US2016/049896, International Search Report and the Written Opinion dated May 19, 2017", 14 pages.
PCT/US2016/049896, , "International Application Serial No. PCT/US2016/049896, International Preliminary Report on Patentability dated Jan. 17, 2019", ASAPP, Inc., 9 pages.
PCT/US2017/040205, , "Application Serial No. PCT/US2017/040205, International Search Report and the Written Opinion dated Sep. 15, 2017", 11 pages.
PCT/US2017/040205, , "International Application Serial No. PCT/US2017/040205, International Preliminary Report on Patentability dated Jan. 17, 2019", ASAPP, Inc., 9 pages.
PCT/US2018/064404, , "International Application Serial No. PCT/US2018/064404, International Search Report and Written Opinion dated Feb. 25, 2019", ASAPP, Inc., 9 pages.
PCT/US2019/014569, , "International Application Serial No. PCT/US2019/014569, International Search Report and Written Opinion dated Mar. 4, 2019", ASAPP, Inc., 13 pages.
Pennington, Jeffrey et al., "GloVe: Global Vectors for Word Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, p. 1532-1543.
Rush, Alexander M. et al., "Optimal Beam Search for Machine Translation", Proceedings of EMNLP 2013, Oct. 18-21, 2013, Seattle, Washington, USA, 2013, 12 pages.

(56) References Cited

OTHER PUBLICATIONS

Scott, Tyler R. et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.
See, Abigail et al., "Get To The Point: Summarization with Pointer-Generator Networks", CoRR abs/1704.04368, http://arxiv.org/abs/1704.04368, Apr. 25, 2017, 20 pages.
Shen, Tianxiao et al., "Style Transfer from Non-Parallel Text by Cross-Alignment", CoRR abs/1705.09655, http://arxiv.org/abs/1705.09655, Nov. 6, 2017, 12 pages.
Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.
Snell, Jake et al., "Prototypical Networks for Few-shot Learning", arXiv:1703.05175v2 [cs.LG], https://arxiv.org/pdf/1703.05175.pdf, Jun. 19, 2017, 13 pages.
Sutskever, Ilya et al., "Sequence to Sequence Learning with Neural Networks", CoRR abs/1409.3215, http://arxiv.org/abs/1409.3215, 2014, 9 pages.
Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.
Ustinova, Evgeniya et al., "Learning Deep Embeddings with Histogram Loss", arXiv:1611.00822v1 [cs.CV], https://arxiv.org/pdf/1611.00822.pdf, Nov. 2, 2016, 9 pages.
Vincent, Pascal et al., "Extracting and Composing Robust Features with Denoising Autoencoders", Proceedings of the 25th International Conference on Machine Learning, Helsinki, Finland, http://www.cs.toronto.edu/~larocheh/publications/icml-2008-denoising-autoencoders.pdf (accessed on Nov. 26, 2018), 2008, 8 pages.
Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.
Vinyals, Oriol et al., "A Neural Conversational Model", CoRR abs/1506.05869, http://arxiv.org/abs/1506.05869, 2015, 8 pages.
Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.
Xiao, Yijun et al., "Efficient Character-level Document Classification by Combining Convolution and Recurrent Layers", CoRR abs/1602.00367, https://arxiv.org/pdf/1602.00367.pdf, Feb. 1, 2016, 10 pages.
Yu, Mo et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.
Zhang, Xiang et al., "Character-level Convolutional Networks for Text Classification", CoRR abs/1509.01626, http://arxiv.org/abs/1509.01626, 2015, 9 pages.
Zhao, Han et al., "Self-Adaptive Hierarchical Sentence Model", CoRR abs/1504.05070, http://arxiv.org/abs/1504.05070, Apr. 27, 2015, 8 pages.

* cited by examiner

S1: How can I help you today?
- BUY_PLANE_TICKET
- CHANGE_RESERVATION
- CANCEL_RESERVATION S2: Where would you like to go?
- AIRPORT
- CITY S3: Which reservation would you like to change?
- CONFIRMATION_NUMBER
- FLIGHT_NUMBER
- NOT_SURE S4: Which reservation would you like to cancel?
- CONFIRMATION_NUMBER
- FLIGHT_NUMBER
- NOT_SURE S5: Where are you leaving from?
- AIRPORT
- CITY S6: What date would you like to leave?
- DATE
- LOW_PRICE_DATE

Fig. 8B

INTENT DISCOVERY WITH A PROTOTYPE CLASSIFIER

FIELD OF THE INVENTION

The present invention relates to automating communications using a neural network and intent prototypes.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures:

FIG. 8B are example outgoing messages and intents for states of a communications system.

DETAILED DESCRIPTION

Figure 1:
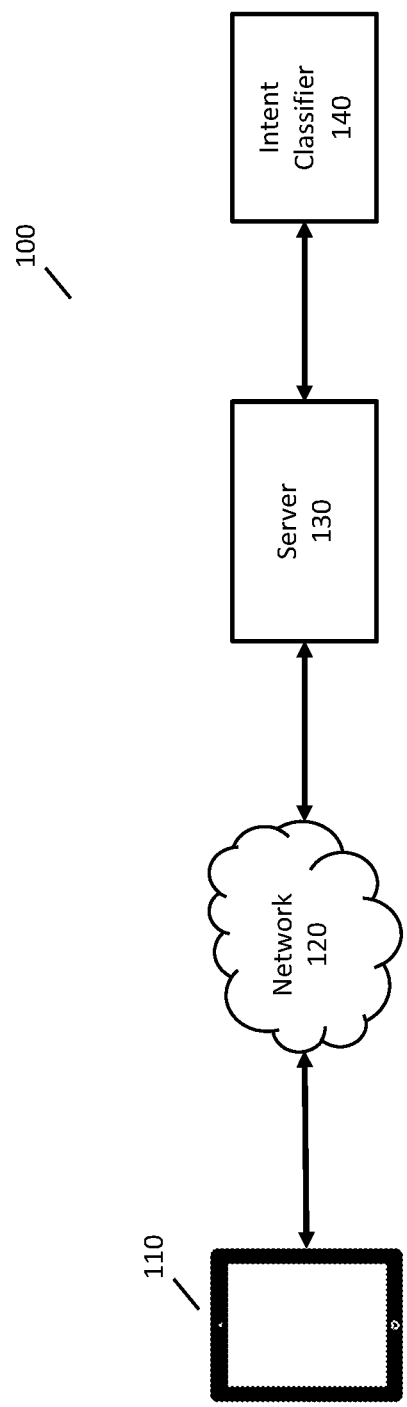
FIG. 1 is an example communications system.

A user may interact with computers or automated services using natural language. For example, a user may type or speak a message that is processed automatically to provide a response to a user. Automated communications with a user may be used for a variety of applications, such as providing information (e.g., weather or stock prices) or for providing customer support to customers of a company. Example descriptions of the present disclosure include operations to provide customer support to customers of a company for purposes of clarity of the description, but the systems, techniques, and devices described herein may be used for any application of automated communications and are not limited to the specific examples recited.

A customer may seek support from a company using a variety of communication techniques, and the techniques described herein are not limited to any particular communication techniques. For example, a customer may communicate by entering text messages or speaking, and the customer may send a message using any appropriate device, such as a computer, smart phone, tablet, wearable device, or Internet of things device. The customer may transmit the message using any appropriate techniques, such as using an app running on a customer device (e.g., an app of the company or a third-party app created for processing customer requests), a web page, a text messaging client, or sending an email. As used herein, a text message includes any message sent as text including but not limited to a message sent using SMS (short message service) or a special-purpose application (e.g., Facebook messenger, Apple iMessage, Google Hangouts, or WhatsApp).

In automating communications with a user, it may be desired to determine an intent of a message received from a user. A company implementing an automated communications system may categorize the messages it expects to receive from customers into a number of specified intents. By categorizing messages into intents, it may be easier for the company to provide an automated response. For example, a YES intent may include a variety of ways of communicating agreement (e.g., "yes", "ok", "that's good", etc.). To provide a response, it may be sufficient to know the intent of the message, and the specific manner in which the intent was expressed may not be important.

A company implementing an automated communications system, may need a large number of intents to understand all of the possible requests that may be submitted by customers. After implementing an automated communications system, a company may later need or desire to add more intents or modify existing intents. Accordingly, a company may need to efficiently determine intents of message received from customers and may also need to be able to efficiently update its automated communications system when it is determined that it is needed or desirable to add additional intents or modify existing intents.

To determine an intent of a message, a company may process a received message with a mathematical model, such as an intent classifier. The mathematical model may provide an output that indicates the intent of the message from a list of possible intents or that indicates that the message does not match any intent of the list of intents.

As used herein, an intent describes a set of messages that have similar meaning. A company may define a set of intents (such as hundreds, thousands, or more intents), and the intents may be defined using any appropriate techniques. For example, an intent may be defined by a mathematical model that processes messages to determine intents of the messages or by a corpus of training data that was used to create the mathematical model. Because a concept may be expressed using a wide variety of language, a single intent may correspond to large number of messages.

An intent may be assigned a label to make it easier for humans to understand the types of messages corresponding to the intent. For example, a YES intent may include messages that express agreement, a NO intent may include messages that express disagreement, and a PAY_BILL intent may include messages that express a desire to pay a bill.

In some implementations, an intent may have slots to allow greater flexibility. For example, where a company sells a large number of products, it may not be feasible to have an intent relating to the purchase of each of the products. Instead, an intent may have a slot (e.g., a parameter or a variable) to allow a single PURCHASE intent to cover the purchase of any product. For example, a PURCHASE intent may have a slot for a product, and when it is determined that a message corresponds to the PURCHASE intent, the message may also be processed to determine the value of the slot (e.g., the customer would like to purchase a stapler).

FIG. 1 is an example system 100 for automating communications with a user. In system 100, a user may use user device 110 to transmit a message seeking customer support from a company. User device 110 may be any device that allows a user to transmit a message, such as a mobile device (e.g., a smart phone), and the message may be entered and transmitted using any appropriate techniques. The message may be transmitted as text or an audio signal of speech that may later be processed with speech recognition techniques.

The message may be transmitted to the company using network 120. Network 120 may include any appropriate communications network, such as the Internet, a mobile device network, a wide area network, or a local area network.

The company may receive the message from the user at server computer 130. Server computer 130 may implement any appropriate techniques for implementing automated communications with a user, such as creating a network connection with user device 110, performing load balancing across multiple server computers, and so forth.

In automating a response to the message received from the user, the company may use intent classifier component 140 to determine an intent of the message received from the user. For example, the intent may relate to concepts expressed in conversation (e.g., "hello", "yes", "I don't understand", etc.) or may relate to specific customer support requests (e.g., "I need to pay my bill"). Intent classifier component 140 may receive a user message from server computer 130, process the user message to determine the intent, and provide server computer 130 with the intent for further processing (e.g., sending a response to the user).

Figure 2:
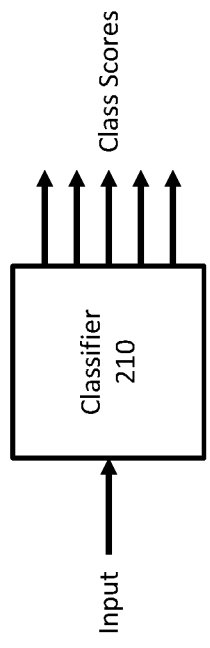
FIG. 2 is an example classifier with a fixed number of classes.

FIG. 2 illustrates an example of a classifier with a fixed number of classes that may be used as an intent classifier. In FIG. 2, classifier 210 receives an input, such as a message, and processes the input to compute class scores. For example, classifier 210 may process the input with a neural network. Each of the class scores indicates a match between the input and a class. For example, where a class score is high, it is likely that the input is an example of the class, and where a class score is low, it is unlikely that the input is an example of the class.

Classifier 210 may be used by a company as an intent classifier to determine an intent of a message received from a user. For example, the company may determine a list of possible intents, obtain example messages corresponding to each intent, and train a mathematical model (e.g., a neural network) that computes scores that indicate a match between an input message and each of the possible intents.

While classifier 210 may be used as an intent classifier, it may have one or more disadvantages. One disadvantage is that to add a new intent to classifier 210, it may be necessary to retrain the entire mathematical model, and retraining a mathematical model may take significant time and resources. Another disadvantage is that, to train a mathematical model for classifier 210, a large amount of training data may be needed. For example, to prevent overfitting of the mathematical model, a large number of examples of each class may be needed, and for at least some classes, sufficient training data may not be available. Another disadvantage is that classifier 210 may not provide a convenient means for determining when users are communicating intents that are not a good match to any of the existing intents.

Figure 3:
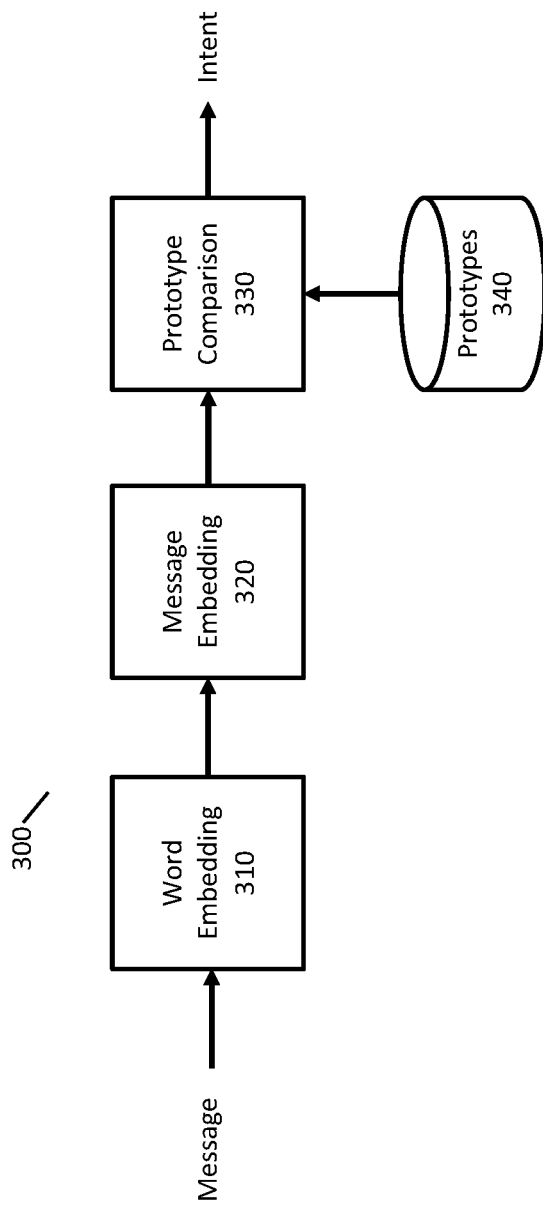
FIG. 3 is an example system for determining an intent of a message using prototype vectors.

FIG. 3 illustrates an example of a system 300 for determining an intent of a message using prototype vectors for the possible intents. The classifier of system 300, referred to herein as a prototype classifier, may overcome one or more of the disadvantages of classifier 210.

For the prototype vectors and any other vectors described herein, a vector comprises any format of storing data, and the data does not need to be stored in the form of a mathematical vector. The data in a vector may be stored in any appropriate form, such as a matrix or a tensor.

In FIG. 3, a message is received. Word embedding component 310 may process the message to obtain a word embedding for each word of the message. A word embedding is a vector in an N-dimensional vector space that represents the word but does so in a manner that preserves useful information about the meaning of the word. For example, the word embeddings of words may be constructed so that words with similar meanings or categories are close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and word embedding component 310 may perform a lookup to obtain a word embedding for each word of the communication.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec, GloVe, or fastText software. A word embedding may accordingly be created for each word in the vocabulary.

Figure 4:
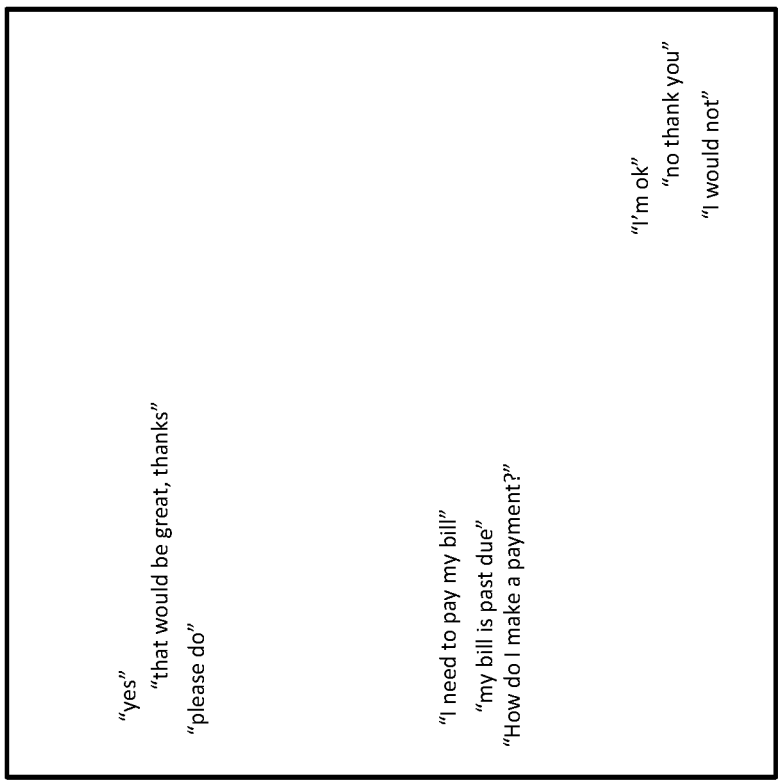
FIG. 4 illustrates example word embeddings in a vector space.

FIG. 4 illustrates an example of word embeddings in a vector space. The word embeddings of FIG. 4 are presented in two dimensions for clarity of presentation, but actual word embeddings may have a much higher dimension, such as 256 dimensions. FIG. 4 presents examples of words in a vocabulary where the words appear in locations in the vector space corresponding to the word embeddings. For example, the words "yes", "sure", and "definitely" are close to each other in the word embedding since the words have similar meaning. Similarly, in the example, "cat", "kitty", and "dog" are close to each other because they all relate to pets.

In FIG. 3, message embedding component 320 receives the word embeddings computed by word embedding component 310, and processes the word embeddings to compute a message embedding. A message embedding is a vector in an N-dimensional vector space that represents the message, but does so in a manner that preserves useful information about the meaning of the message. The vector space may be different from the word embedding vector space and the dimension of the message embedding vector space may also be different from the dimension of the word embedding space.

Figure 5:
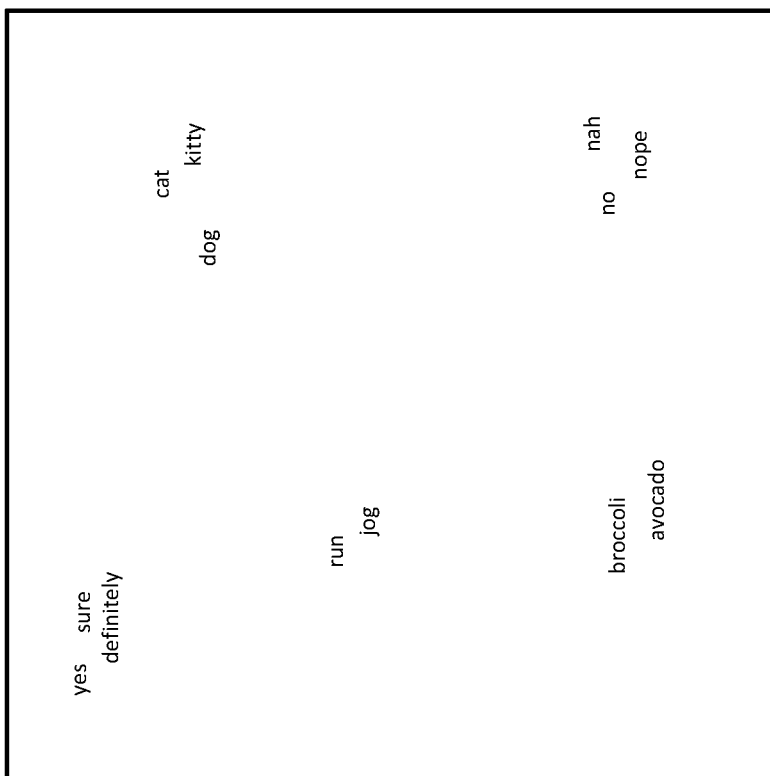
FIG. 5 illustrates example message embeddings in a vector space.

FIG. 5 illustrates an example of message embeddings in a vector space. The message embeddings of FIG. 5 are presented in two dimensions for clarity of presentation, but actual message embeddings may have much higher dimension, such as 256 dimensions. FIG. 5 presents examples of messages where the messages appear in locations in the vector space corresponding to the message embeddings. For example, the messages "yes", "that would be great, thanks", and "please do" are close to each other in the message embedding since the messages have similar meaning. The messages may be close to each other in the message embedding vector space even though the messages express the similar meanings using different words.

Message embedding component 320 may use any appropriate techniques to compute a message embedding from the word embeddings of the message. In some implementations, message embedding component 320 may process the word embeddings with a mathematical model, such as a neural network, to compute the message embedding. For example, the neural network may include one or more recurrent neural network and/or convolutional neural network layers. Examples of mathematical models for message embedding component 320 are described in greater detail below.

Prototype comparison component 330 may receive the message embedding from message embedding component 320 and determine the intent of the message by comparing the message embedding with prototype vectors for possible intents. The prototype vectors may be obtained, for example, from prototypes data store 340.

A prototype vector for an intent may be computed from message embeddings of messages corresponding to the intent, where the message embeddings may also be computed from message embedding component 320. Because the messages corresponding to an intent have similar meanings, the message embeddings of messages corresponding to the intent will be close to each other in the vector space of the message embeddings. For example, in FIG. 5, the messages that are close to each other in the message embedding vector space have similar meanings to each other.

Figure 6:
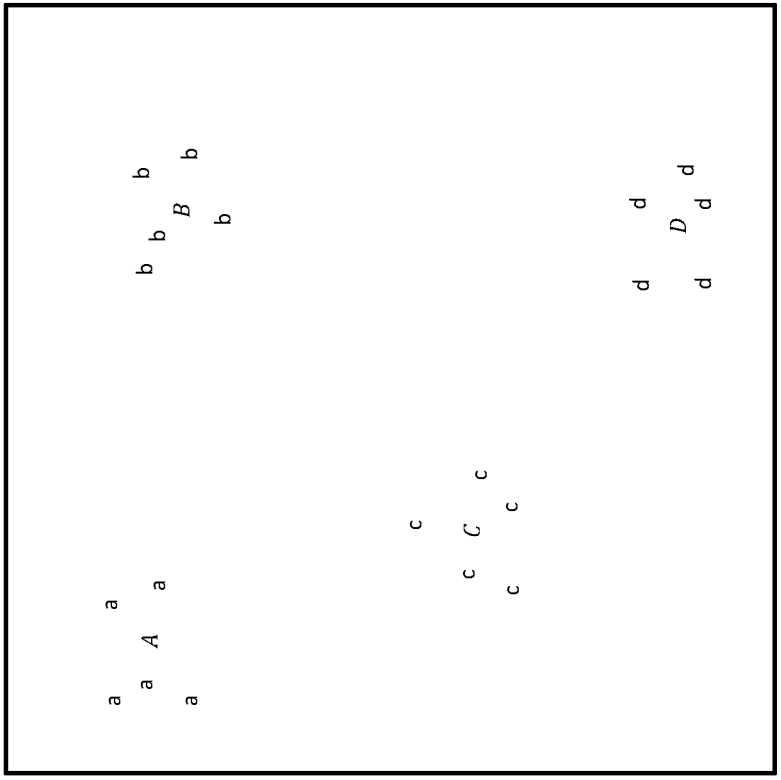
FIG. 6 illustrates example prototype vectors for word embeddings with different intents.

FIG. 6 illustrates an example of prototype vectors computed for four different intents. In FIG. 6, the letters "a" indicate message embeddings of messages corresponding to a first intent, and the letters "b", "c", and "d", correspond to message embeddings of messages corresponding to three other intents. A prototype vector may be computed for each intent using the message embeddings of the messages corresponding to an intent. For example, a prototype vector for the first intent may be computed from the message embeddings labelled "a", and an example of such a prototype vector is labelled "A". Similarly, prototype vectors may be computed for the other intents.

Any appropriate techniques may be used to compute a prototype vector for an intent from message embeddings of messages corresponding to the intent. For example, the prototype vector may be a mean of the message embeddings of the messages of the intent or some other function or combination of the message embeddings that is representative of the message embeddings.

Figure 7:
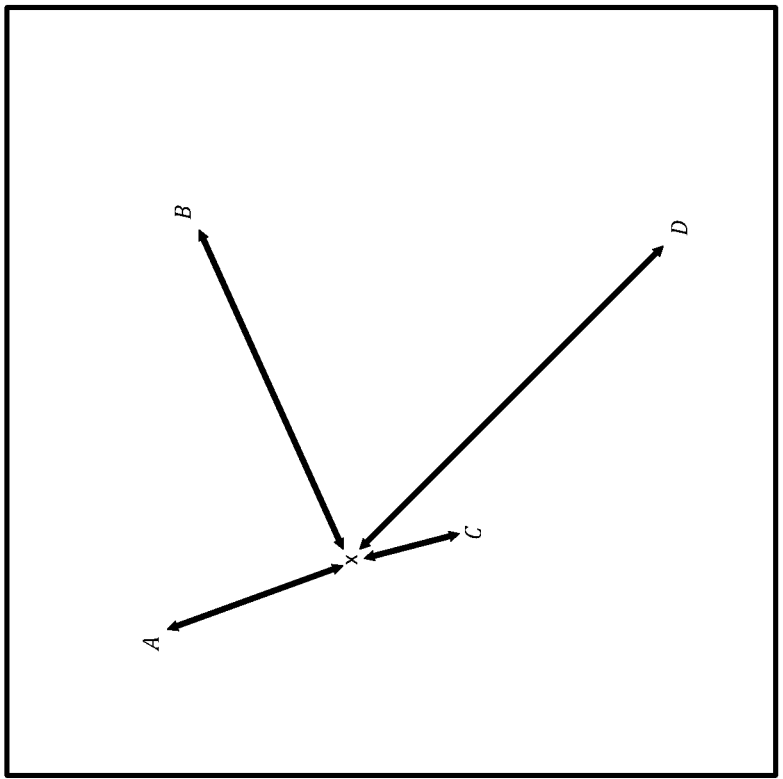
FIG. 7 illustrates selecting an intent of a message using prototype vectors.

Prototype comparison component 330 may compare the message embedding of the input message with the prototype vectors using any appropriate techniques. FIG. 7 illustrates an example of comparing the message embedding to the prototype vectors of the intents by computing a distance between the message embedding and the prototype vectors. In FIG. 7, the message embedding of the input message is indicated as x, and the lines indicate the distance between the message embedding and each of the prototype vectors. In some implementations, a Euclidean distance may be computed, and an intent may be selected as corresponding to the prototype vector that is closest to the message embedding. Where the message embedding is not sufficiently close to any of the prototype vectors (e.g., larger than a threshold distance), it may be determined that the input message does not correspond to any of the intents.

In some implementations, a measure of spread, such as a covariance matrix, may be computed for each intent. For example, a sample covariance matrix for an intent may be computed from the message embeddings of the messages corresponding to the intent. The measure of spread may be used when comparing the message embedding to the prototype vectors. For example, a prototype vector and spread may be used to create a multivariate normal distribution for the intent, and the comparison between the message embedding and the prototype vector may be computed as the probability that the message embedding was generated by the normal distribution. An intent may be selected for the prototype vector that corresponds to the largest probability for the input message.

In some implementations, hierarchical techniques may be used to select the prototype vector. Where the number of intents is large, significant computational resources may be required to compare the message embedding to each of the prototype vectors. Hierarchical techniques may be used to reduce the required computations for selecting a prototype vector. For example, the prototype vectors may be clustered into a number of clusters. The message embedding may be compared with the clusters to select a cluster, and then a prototype vector may be selected from the selected cluster. Multiple levels of clustering may be used to further improve the performance and/or reduce the computations of the hierarchical selection. Any appropriate techniques may be used to compare a message embedding with a cluster, such as a Mahalanobis distance; a transport distance; a distance to a prototype vector of the cluster; or a minimum, maximum, or averages distance of the message embedding to the points of the cluster.

Now described are additional details of example mathematical models that may be used by message embedding component 320.

A mathematical model for computing a message embedding may be trained using a corpus of training data. The corpus of training data may include examples of messages expected to be received and each message may be labelled with a corresponding intent. Any appropriate techniques may be used to assign labels to the messages of the training corpus, such as having a person manually assign a label to each message.

Denote the mathematical mode implemented by message embedding component 320 as m. This mathematical model processes a sequence of word embeddings to compute a message embedding vector. For example, the model m may be implemented as one or more neural network layers, such as recurrent neural network layers. The model m may be initialized using any appropriate techniques, such as selecting random values for the model parameters.

The initial model m may be used to create an initial set of prototype vectors from the training data. Denote the set of messages from the training data corresponding to class k as $X_k$, and denote the prototype vector for class k as $p_k$. An initial prototype vector for each class may be computed using the message embeddings compute by the initial model m. For example, the prototype vectors may be computed as an average of the message embeddings of the training data for the class:

$$p_k = \frac{1}{N_k} \sum_{x_i \in X_k} m(x_i)$$

where $N_k$ is the number training examples of class k.

The parameters of the model m may then be updated so that message embeddings of training data in the same class are moved closer to each other and message embeddings of training data in different classes are moved further apart. For example, the performance of the model m in separating the classes may be computed as $$f(x, k) = \frac{\exp(-d(m(x), p_k))}{\sum_j \exp(-d(m(x), p_j))}$$

where $f$ is a function of a message x from the training data and the class label k of the message x and d is a distance function, such as a Euclidean distance or a hyperbolic distance.

The parameters of model m may be updated, for example, by iterating over the training data and minimizing the negative log-probability of the function $f$. After updating the parameters of model m, the process may be repeated. The updated model m may be used to compute updated prototype vectors, and the updated prototype vectors may be used to again update the parameters of model m. The process may be repeated until a desired convergence criterion has been met.

The prototype classifier of FIG. 3 may overcome one or more of the disadvantages of the classifier of FIG. 2.

In some implementations, new intents may be added to the prototype classifier without retraining the mathematical model used by message embedding component 320. One or more example messages may be available for the new intent to be added. The example messages may be processed by message embedding component 320 to compute a message embedding for each of the example messages. A new prototype vector for the new intent may be computed by combining the message embeddings of the example messages, such as by computing an average of the message embeddings. The new prototype vector may then be added to prototypes data store 340, and prototype comparison component 330 may use the new prototype vector for the new intent in future processing. Accordingly, a new intent may be added without altering the mathematical model of message embedding component 320.

In some implementations, additional steps may be performed to ensure that the new prototype vector is sufficiently far away from the existing prototype vectors and that the message embeddings of the example messages for the new intent are sufficiently close to each other. Where one of these two checks is not sufficient, it may be determined to retrain the mathematical model of message embedding component 320 to improve performance.

In some implementations, a prototype classifier may be used where the number of example messages for one or more intents is small or even with only one example message for an intent. A classifier will generally need a sufficient amount of training data to avoid overfitting the classifier to the training data. Where a prototype classifier has a sufficient amount of training data overall (e.g., because there are a large number of classes or because there is a sufficient number of training examples over a sufficient number of classes), the prototype classifier may avoid overfitting individual intents that have a small number of training examples.

In some implementations, a prototype classifier may be used to identify new intents the are being used by users but not currently included in a set of known or possible intents. The message embeddings of some messages received from users may be far from all of the prototype vectors. A cluster of message embeddings that are far from existing prototype vectors may indicate that a new intent should be created using the corresponding messages. Techniques for determining to create a new intent when using a prototype classifier are discussed in greater detail below.

Automated Communications System

Figure 8A:
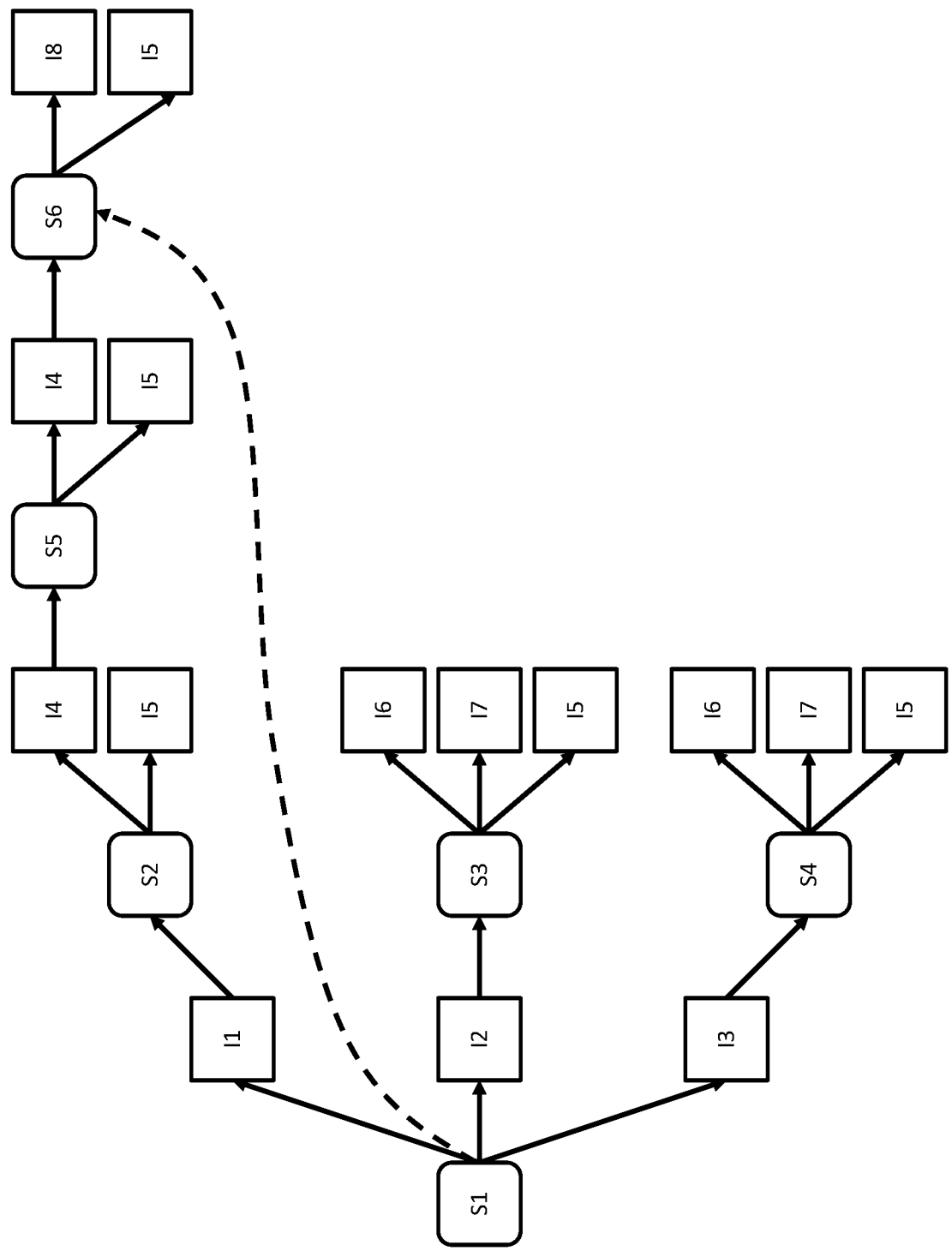
FIG. 8A is a graph for use with a communications system.

The intent classifier of FIG. 3 may be applied to automating communications with a user. In some implementations, automated communications may use a graph (such as a directed graph or a tree) in guiding or structuring the receipt of information from the user. FIG. 8A illustrates an example graph that may be used for automated communications, and FIG. 8B illustrates example outgoing messages and intents for a communications system for handling airline reservations.

The graph of an automated communications system may have different states or nodes, and each state or node of the communications system may be designed to obtain a particular type of information from the user. Each state may have a corresponding outgoing message for presentation to the user where the outgoing message is expected to elicit certain types of responses from the user. Each state may also be associated with one or more intents that correspond to messages that are expected to be received from the user. Where a message matches an associated intent, processing may proceed to a further state of the graph.

For example, the graph may have a root state that is used when starting a conversation with a user. In this example, the root state is marked as S1, and at state S1, the message "How can I help you today?" is presented to the user. Because the example application is for airline reservations, it may be expected that the user will respond with a message relating to one of three intents: (I1) BUY_PLANE_TICKET for starting the purchase of a plane ticket, (I2) CHANGE_RESERVATION for changing a previously made reservation, and (I3) CANCEL_RESERVATION for cancelling a previously made reservation.

Based on the response received from the user, processing may proceed to a next state in the graph. For example, for intent I1, processing may proceed to state S2, for intent I2, processing may proceed to state S3, and for intent I3, processing may proceed to state S4.

Suppose the user responded with "I would like to buy a plane ticket." This message matches intent I1 and thus processing proceeds to state S2. At state S2, the user is presented with the message "Where would you like to go?" and it may be expected that the user will respond with one of two intents: (I4) LOCATION for specifying a destination location or (I5) for START_OVER in case the user changed his mind or was misunderstood in the previous interaction.

Back at state S1, the user may instead respond with "I need to change a reservation." This message matches intent I2 and thus processing proceeds to state S3. At state S3, the user is presented with the message "Which reservation would you like to change?" and it may be expected that the user will respond with one of three intents: (I6) CONFIRMATION_NUMBER for identifying a reservation by a confirmation number, (I7) FLIGHT_NUMBER for identifying a reservation by a flight number, or (I5) START_OVER in case the user changed his mind or was misunderstood in the previous interaction.

Note that intent I5 is available at both state S2 and state S3. The manner in which a user is expected to express intent I5 may be independent of the current state of the communications system. Accordingly, the same intent may be used at both states to increase the efficiency of the communications system.

Back at state S1, the user may instead respond with "I need to cancel a reservation." This message matches intent I3 and thus processing proceeds to state S4 where the user would be presented with the message "Which reservation would you like to cancel?" Here, the expected intents may be the same as state S3, and it may be expected that the user respond with (I6) CONFIRMATION_NUMBER, (I7) FLIGHT_NUMBER, or (I5) START_OVER.

The graph of FIG. 8A may continue with additional states and expected intents. For example, state S2 may request the destination location, state S5 may request the departure airport, state S6 may request the departure date, and so forth. A user may progress through the graph of FIG. 8A until the user has completed the desired task, such as purchasing a plane ticket.

A communications system implemented with a graph, such as the graph of FIG. 8A may use an intent classifier to process messages received from a customer.

In some implementations, an intent classifier may be trained for each state of the graph to determine the intent of the user's response at that state. For example, at state S1, a first intent classifier may be trained determine if a message from the customer corresponds to intent I1, intent I2, or intent I3, and at state S2, a second intent classifier may be trained to determine if a message from the customer corresponds to intent I4 or intent I5.

In some implementations, an intent classifier may be trained for multiple states of the graph or even all states of the graph. In the example graph of FIG. 8A, a single intent classifier may be trained to classify a message received from a user at any state to any of the intents shown on the graph. In practice, a graph may be much larger, and a single intent classifier may be trained to classify a message received from a user from among hundreds, thousands, or more possible intents.

In some implementations, the prototype classifier of FIG. 3 may be used with a graph. Where a prototype classifier is used, a prototype vector may be created for each of the intents in the graph. At state S1, an outgoing message is presented to a user, and an incoming message is received. A message embedding may be computed for the incoming message, and the message embedding may be compared with the prototype vectors for intents I1, I2, and I3 to determine the intent of the incoming message. After determining the intent, processing may proceed to the next state (e.g., state S2, S3, or S4) and repeated with the next outgoing and incoming message.

Using a prototype classifier with the graph of FIG. 8A may provide advantages over using other types of classifiers, such as the classifier of FIG. 2 or the prototype classifier of FIG. 3 without a graph.

Training a single classifier to determine all of the possible intents of a communications system may be more efficient and provide better performance than training a classifier for each state of the communications system. Because the prototype classifier is trained to recognize every possible intent, a much larger amount of training data may be used than when training a classifier that recognizes a smaller number of intents. The prototype classifier may thus perform better and be less likely to overfit the training data. Having a single classifier for the communications system instead of a classifier for each state may also simplify the logistics in training and deploying the communications system.

The use of a prototype classifier adds flexibility in the construction and modification of a communications system. For example, if it is desired to add a new intent to a state of the graph, the only needed change may be to indicate that an additional intent is possible at that state when comparing the message embedding of an incoming message to prototype vectors of possible intents for the state. The existing prototype classifier may continue to be used without changing the mathematical model for computing word embeddings.

The use of a prototype classifier also allows a single intent to be used at multiple states. For example, a YES intent and a NO intent may be commonly used to obtain confirmation from a user that received information has been understood correctly. The prototype vector for the YES intent and the prototype vector for the NO intent may be used at any number of states of the communications system.

In some implementations, it may be desired to add flexibility to the communications system to make it easier to use. For example, the default flow of the communications system may include the following steps: (1) determine that the user wants to buy a plane ticket, (2) determine the destination location, (3) determine the departure location, (4) determine the departure date, and (5) determine the return date. It may be slow and inconvenient for a user to supply each piece of information in a separate step.

The communications system may be modified to allow the user to express intents that are not part of the default flow of the communications system. For example, in response to the message "How can I help you today?", the expected intents may correspond to the three intents shown in FIG. 8B for state S1. Instead of responding with one of those three intents, the user may respond, "I would like to purchase a ticket from Boston to Paris". This message may correspond to an intent, BUY_PLANE_TICKET_WITH_DEPARTURE_AND_DESTINATION. In response to receiving this intent, the processing of the communications system may skip states S2 and S5 and proceed to state S6 since the user has already provided the departure and destination locations. This path is indicated by the dashed line in FIG. 8A.

Intents used with a communications graph may have different types. A first type for intents may be intents that correspond to expected responses from an outgoing message at a current state. These intents may cause the communications system to proceed to a subsequent state that is connected to the current state. In some instances, the expected intents may only be meaningful with respect to the current state. For example, if the received message corresponds to a CITY intent, the specified city may relate to a destination city, a departure city, or even a new address of the user. If the current state requests a destination for a trip, then it is clear that the CITY intent corresponds to a destination city, but the same CITY intent may be used for other purposes at other states.

A second type for intents may be intents that relate to the current request of the user but provide different information than requested or additional information than what was requested. For example, at state S2, the user is asked where they would like to go. The user may instead respond with "I would like to leave from Boston Logan." The response corresponds to a DEPARTURE_AIRPORT intent which was not expected, but it does relate to the current request of the user to purchase an airline ticket. In response to receiving this message, the communications system my jump or transfer to a different state of the graph that is capable of processing a DEPARTURE_AIRPORT intent without having received the destination location.

A third type for intents may be intents that do not relate to the current request of the user. For example, the user may start the process of purchasing a ticket, and then in response to being asked where they would like to go, the user may respond with "First, I need to cancel my airline ticket with confirmation code XYZ123." Although this intent does not relate to the current request of the user, it may relate to a request that is understandable by the communications system. For example, this message may match a CANCEL_WTH_CONF_CODE intent. In response to receiving this message, the system may jump or transfer to a different state of the graph for processing this intent.

At a particular state, after receiving a message from a user, the intents may be checked in a specified order to improve the efficiency of the communications system. For example, a communications system may have many thousands of intents, and it may be computationally demanding to compare a message embedding for a received message to prototype vectors for all of the possible intents. The order may be specified using any appropriate techniques.

In some implementations, the possible intents may be divided into two or more groups. A message embedding may be compared with all the prototype vectors for a first group of intents. If there is a match, then the matching intent may be used, and no further intent comparisons may be performed. If there is not a match with the first group, then the message embedding may be compared with all the prototype vectors for a second group of intents. If there is a match, then the matching intent may be used, and no further intent comparisons may be performed. If there is not a match with the second group, then the process may be continued with a third group of intents, and so forth.

In some implementations, the possible intents may be ordered, and the intents may be checked in that order. For example, a message embedding may be compared with a prototype vector for a first intent. If there is not a match, then the message embedding may be compared with a prototype vector for a second intent, and so forth.

In some implementations, multiple thresholds may be used in comparing a message embedding with prototype vectors. A smaller threshold may indicate a high confidence match and no further comparisons may be needed. A higher threshold may indicate a lower confidence match and further comparisons may be performed to see if another intent provides a better match, but if no other intent provides a better match, then the lower confidence match may be used.

Figure 9:
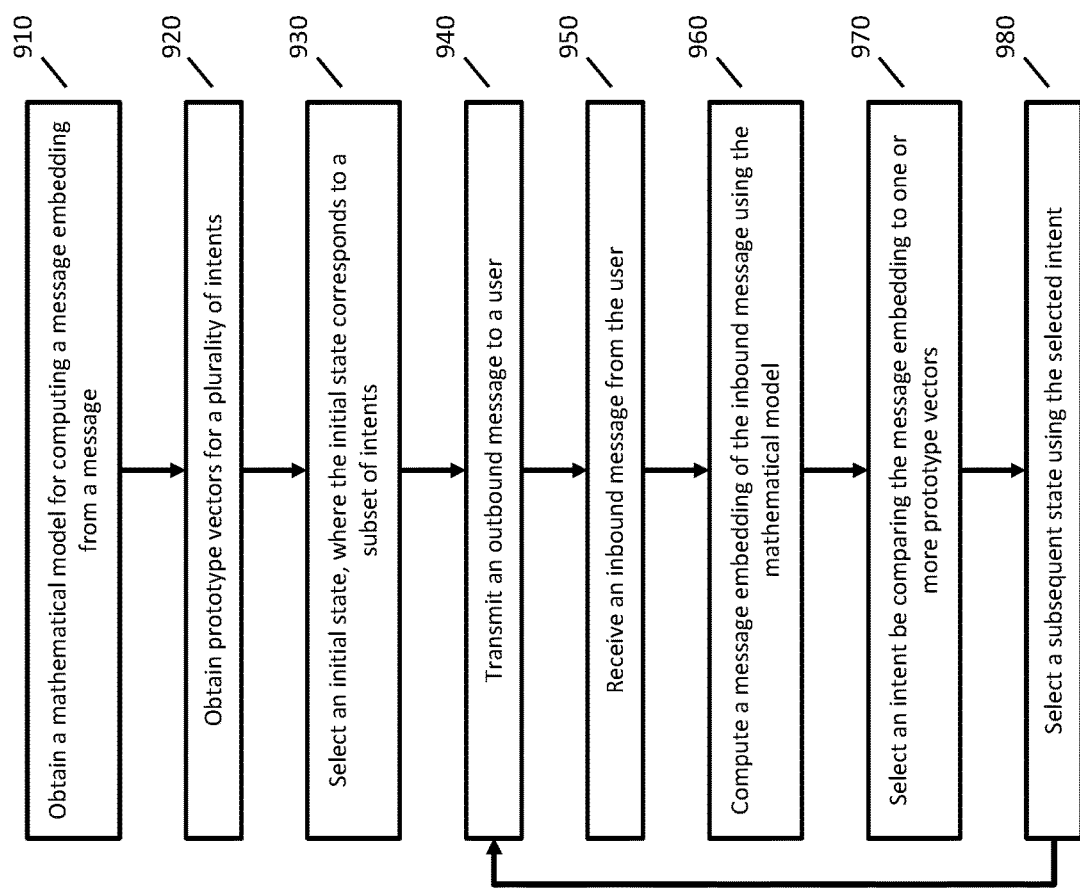
FIG. 9 is an example method for implementing a communications system using prototype vectors.

FIG. 9 is a flowchart of an example method for implementing a communications system using prototype vectors. In FIG. 9 and other flowcharts herein, the ordering of the steps is exemplary and other orders are possible, not all steps are required, steps may be combined (in whole or part) or sub-divided, and other steps may be added. The methods described by any flowcharts described herein may be implemented, for example, by any of the computers or systems described herein.

At step 910, a mathematical model, such as a neural network, is obtained for computing a message embedding from a message. Any of the techniques described herein may be used to compute a message embedding from a message. For example, word embedding may be obtained for the words of the message, and a neural network (e.g., a recurrent neural network) may process the word embeddings to compute the message embedding.

At step 920, prototype vectors are obtained corresponding to possible intents of the communications system. Any appropriate intents may be used, and any of the techniques described herein may be used to compute a prototype vector for an intent. In some implementations, one or more example messages may be obtained for each intent, and the mathematical model of step 910 may be used to compute a message embedding for each of the example messages. A prototype vector for an intent may be computed by combining the message embeddings of the example messages of the intent. For example, the prototype vector may be the average of the message embeddings.

At step 930, an initial state is selected for communicating with a user. For example, the initial state may be the root of a graph or tree of states. The initial state may be associated with an outgoing message, such as "How can I help you today?" The initial state may also be associated with one or more groups of intents where each group of intents is a subset of the possible intents from step 920. For example, a first group of intents may correspond to expected intents for messages received from the user at that state.

Steps 940 to 980 may be performed one or more times for different states. A first iteration of the steps may be performed using the initial state selected at step 930. During this first iteration, another state may be selected, and the steps may be performed with the selected state. This process may be repeated until the communications are complete, such as by completing a request of the user. The description of the steps below refer to a current state as the current state of the iteration.

At step 940, an outbound message corresponding to the current state is transmitted to the user. At step 950, an inbound message is received from the user. The outbound and inbound messages may be transmitted as audio or text using any of the techniques described herein. At step 960, a message embedding is computed from the inbound message using any of the techniques described herein.

At step 970, an intent is selected for the inbound message using the message embedding of the inbound message and one or more prototype vectors of one or more intents. Any of the techniques described herein may be used to select the intent of the message.

In some implementations, the current state may be associated with one or more groups of intents where each group of intents is a subset of the possible intents. For example, a first group of intents may correspond to expected intents of the user in response to the outgoing message, a second group of intents may correspond to intents that are related to the current request of the user as established by previous requests of the user (e.g., the user has started the process of purchasing a plane ticket), and a third group of intents may correspond to intents that don't relate to the current request of the user. The groups of intents may overlap with each other (e.g., have an intent in common with each other) or be disjoint (e.g., no intent appears in more than one group).

An intent may be selected by comparing the message embedding with prototype vectors for one or more intents. For example, a distance may be computed between the message embedding and one or more prototype vectors. An intent may be selected, for example, when the message embedding is sufficiently close to a prototype vector (e.g., a distance less than a threshold) or by selecting a closest prototype vector. The message embeddings may be compared with prototype vectors in any appropriate sequence. For example, the prototype vectors may be ordered and processed in that order or a first group of prototype vectors may be processed, and if there is no sufficient match, then a second group of prototype vectors may be processed, and so forth.

At step 980, a subsequent state is selected using the selected intent. In some instances or implementations, the subsequent state may be connected to the current state in a graph. In some instances or implementations, the current state and the subsequent state may be part of a graph but may not be connected. In some implementations, the current state and the subsequent may not be part of a graph.

In some implementations, for each intent of a first group of intents corresponding to the current state, the subsequent state is connected to the current state in a graph. In some implementations, for each intent of a second group of intents corresponding to the current state, the current state and the subsequent state are part of a graph, but the subsequent state is not connected to the current state in the graph.

The subsequent state may be associated with an outgoing message and may also be associated with one or more groups of intents where each group of intents is a subset of the possible intents from step 920.

Where the subsequent state indicates that the user's request has been completed, then an action may be performed on behalf of the user and communications with the user may be complete. Where the subsequent state indicates that additional communications are needed, then processing may proceed to step 940 with the subsequent state as the current state.

The processing of FIG. 9 may be used for any appropriate application. For example, a customer of a company may contact the company to obtain assistance, such as to make a purchase, sign up for a subscription, change an address, request a copy of a bill, pay a bill, or request the status of a previous transaction.

Intent Discovery

When a company designs a communications system, it may specify a set of intents that it believes customers are likely to use. In specifying the set of intents understood by the communications system, the company may unintentionally not include an intent that its customers are actually using, may include an intent that is too broad in that a single intent may cover messages with varied meanings, or make other decisions regarding intents that may be improved. A company may also change aspects of its business, such as adding a new product or service, and add new intents or modify existing intents corresponding to the changes to the business.

When a communications system is implemented using a prototype classifier, such as the prototype classifier of FIG. 3, the usage data from the communications system may allow discovery (1) of an intent used by users that is not currently understood by the communications system, (2) that an existing intent is too broad and would be better split into two different intents, (3) that an intent is not used by users and should be removed, (4) that two intents are similar in meaning and should be merged, or (5) that a new intent should be created.

Figure 11:
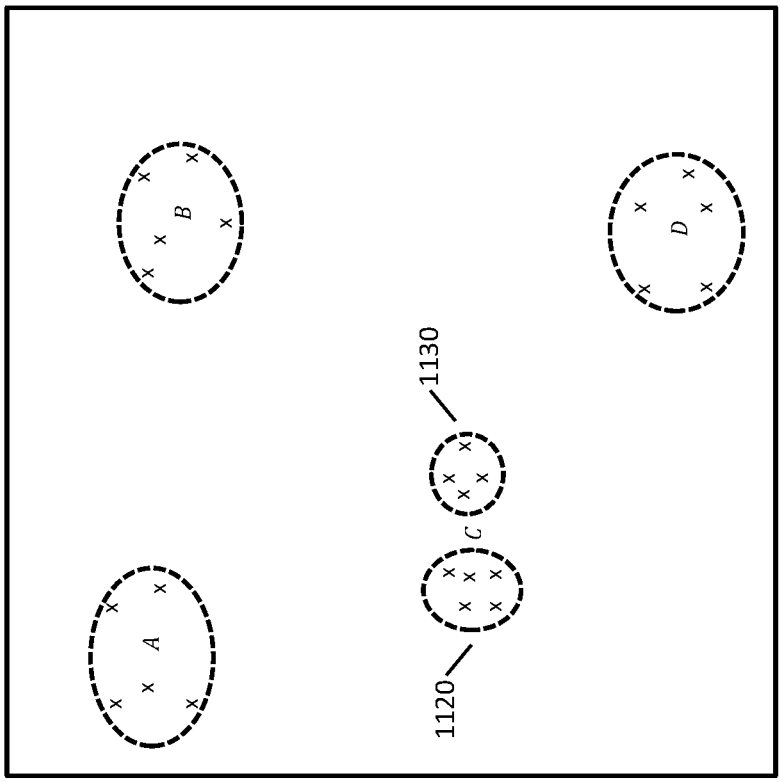
FIG. 11 illustrates splitting an existing intent into two intents using a clustering of message embeddings of usage data.
Figure 10:
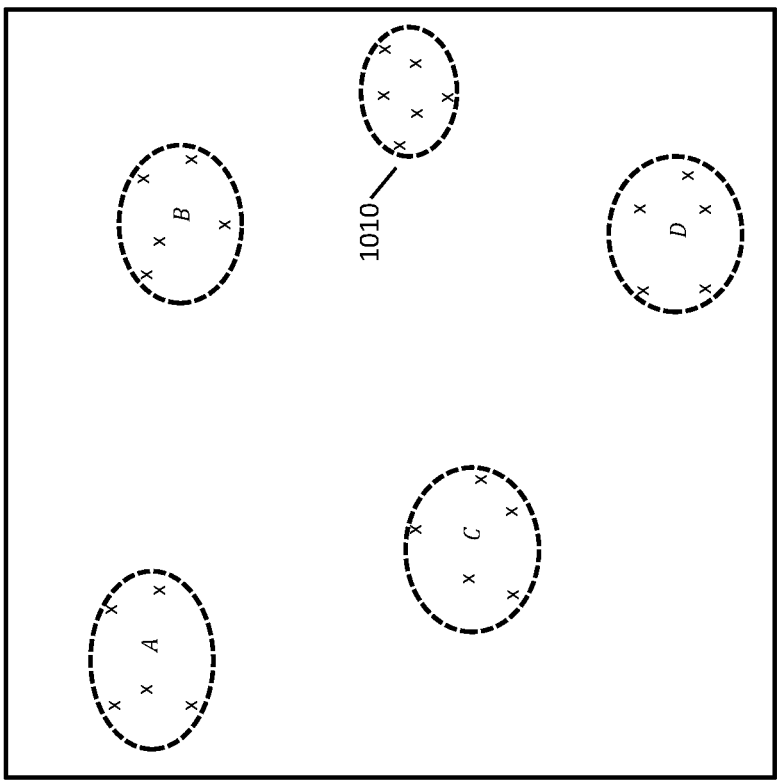
FIG. 10 illustrates creating a new intent using a clustering of message embeddings of usage data.

To perform intent discovery, usage data of the communications system may be collected over a period of time, such as a day, a week, or a month. The collected usage data may include data relating to all messages from users or data relating to some of the messages from users, such as messages that did not match an existing intent (e.g., messages whose message embedding was not sufficiently close to a prototype vector of an intent). The collected usage data may include the message embeddings of the messages or data to allow the message embeddings to be recomputed (e.g., the text of the messages). FIG. 10 and FIG. 11 illustrate two different examples of usage data where each "x" represents a message embedding of the usage data.

The message embeddings of the usage data may be clustered into a plurality of clusters. Any appropriate clustering techniques may be used, such as hierarchical clustering, centroid-based clustering (e.g., k-means), or density-based clustering. In some implementations, the usage data may be combined with other data (e.g., previous usage data or data used to create the prototype classifier) and clustered with the other data. In FIG. 10 and FIG. 11, the clusters are illustrated with the dashed ovals.

The clusters of usage data may be used to discover a new intent that is not currently understood by the communications system. Any appropriate techniques may be used to discover a new intent using the clusters.

In some implementations, each cluster may be compared with prototype vectors of existing intents to find clusters that are sufficiently far from existing intents. A cluster that is sufficiently far from existing prototype vectors may be more likely to represent an intent that is different from existing intents. For example, a distance may be computed between each cluster centroid and the closest prototype vector, and where the distance is larger than a threshold, then the cluster may be a candidate for a new intent. In some implementations, other measures may be used, such as a Mahalanobis distance, a Bregman divergence, a Bhattacharyya distance, or a Hellinger distance.

To determine that a cluster is sufficiently far from existing intents, the distance between the cluster and the closest prototype vector may be compared to a threshold. In some implementations, the threshold may be determined from the distances between existing prototype vectors. For example, a distance may be computed for each pair of prototype vectors. The threshold may be computed from these pairwise distances, such as by selecting a smallest distance (or a fraction of the smallest distance) or using a statistic of the pairwise distances (e.g., a number of standard deviations below the mean). Any of appropriate techniques may be used to compare a cluster to a vector, such as any of the distances described herein.

In some implementations, a density may be computed for the clusters, and clusters that are sufficiently dense may be candidates for a new intent. A cluster that is sufficiently dense may be more likely to include messages with similar meanings, and a cluster that is not sufficiently dense may include messages with meanings that should not be part of the same intent. Any appropriate measure of cluster density may be used. For example, cluster density may be measured as the average distance (or squared distance) of the points of the cluster to the center of the cluster. For another example, cluster density may be measured using a covariance matrix of the points of the cluster (e.g., the largest variance or an average variance).

To determine that a cluster is sufficiently dense, the density of the cluster may be compared to a threshold. In some implementations, the threshold may be determined from densities for existing intents. For example, a density may be computed for each existing intent using messages corresponding to the intents (e.g., example messages used to originally create the intent or from the usage data). The threshold may be computed from the densities of the existing intents, such as by selecting a smallest density (or a fraction of the smallest density) or using a statistic of the densities (e.g., a number of standard deviations below the mean).

In some implementations, a number of messages in the cluster may be used in deciding whether a cluster is a candidate for a new intent. A cluster with a small number of messages may correspond to an infrequently used intent that should not be included in the communications system.

A decision to create a new intent using a cluster may be determined based on one or more of the distance of the cluster to existing intents, the cluster density, the number of messages in the cluster, and any other appropriate criteria. For example, it may be decided to create a new cluster if one or more of the following is satisfied: the distance to existing intents is greater than a first threshold, the density is greater than a second threshold, or the number of messages is greater than a third threshold. For example, cluster 1010 of FIG. 10 may meet the requirements for a new intent and a prototype vector for the new intent may be created from the messages of the cluster.

The clusters of usage data may also be used to determine that an existing intent should be split into two or more intents. For example, the system may include an intent FLIGHT_IDENTIFIER that indicates a user is identifying a plane flight. In practice, the user may identify a flight using a confirmation number or a flight number, and the performance of the system may be improved if the FLIGHT_IDENTIFIER intent is split into a CONFIRMATION_NUMBER intent and a FLIGHT_NUMBER intent to cover the two ways that users identify flights. Any appropriate techniques may be used to determine to split an existing intent into two or more intents.

It may be determined to split an existing intent if two or more clusters are sufficiently close to an existing prototype vector. For example, in FIG. 11 cluster 1120 and cluster 1130 may be sufficiently close to the existing prototype vector for intent C. In some implementations, the determination of whether to split an intent may be based on the densities of the clusters and/or the number of messages in the clusters. If a cluster is not sufficiently dense or does not have a sufficient number of messages, it may not be considered in deciding whether to split an intent.

In some implementations, the two or more clusters that are candidates for splitting an intent may be compared with each other in determining whether to split an intent. For example, if two clusters are too close to each other, then it may be determined not to split the intent.

A decision to split an existing intent using two or more clusters may be determined based on one or more of the distance of the one or more clusters to an existing intent, the cluster densities, the number of messages in the clusters, the distances of the one or more clusters to each other, and any other appropriate criteria. For example, it may be decided to create a new cluster if one or more of the following is satisfied: the distance between each of the two or more clusters and an existing intent is less than a first threshold, the density of each of the two or more clusters is greater than a second threshold, the number of messages in each of the two or more clusters is greater than a third threshold, or the pairwise distances between pairs of the two or more clusters is greater than a fourth threshold. For example, cluster 1120 and cluster 1130 of FIG. 11 may meet the requirements for splitting intent C into two intents. Similar techniques may also be applied split an intent into three or more intents.

The clusters of usage data may also be used to determine to merge two or more existing intents into a single intent. For example, where a single cluster is the only cluster that is close to two existing intents, it may be decided to merge the two intents by computing a single prototype vector for the merged intent using messages from the two existing intents. The decision may also be based on the spread or variance of the cluster. For example, a Mahalanobis distance between each of the prototype vectors and the cluster may be used in determining whether to merge two intents.

A decision to merge two existing intents into a single intent may be determined based on one or more of the distance between the prototype vectors of the two existing intents, the distance of the single cluster to each of the prototype vectors of the two existing intents, and any other appropriate criteria. For example, it may be decided to merge two intents into a single intent if one or more of the following is satisfied: the distance between the prototype vectors of the two existing intents is less than a first threshold or the distance between the prototype vectors and the cluster is less than a second threshold. Similar techniques may also be used to merge more than two intents into a single intent.

The clusters of usage data may also be used to determine to discard an existing intent. For example, where a number of messages of the usage data that were classified as corresponding to an existing intent is less than a threshold, it may be determined to discard the existing intent. For another example, if no cluster is close to a prototype vector of an existing intent, it may be determined to remove the intent from the communications system.

In some implementations, the addition of a new intent, the splitting of an existing intent, the merging of two existing intents, and the removal of an intent may be performed automatically without the involvement of a person. In some implementations, however, a person may be involved, such as by approving any changes to the intents.

In some implementations, information about the proposed change to the intents may be presented to a person. A proposal to add, split, merge, or remove an intent may be presented to a person with one or more of the following: example messages of existing intents or new intents, a density of existing intents or new intents, a number of messages from the usage data corresponding to the existing intents or new intents, distances between existing intents and/or new intents, or information about other intents that are close to intents being modified.

In some implementations, some changes to intents may be performed automatically and some changes to intents may be presented to a person for approval. Whether a change to an intent is presented to a person may be based, for example, on a type of the intent (e.g., certain types of intents may be indicated to require presentation to a person before changes are made) or on parameters or values relating to the proposed change (e.g., intent changes with low confidence or close to decision thresholds may require presentation to a person before changes are made). In some implementations, an administrator or manager may set rules or thresholds indicating which proposed changes may be implemented automatically and which proposed changes should be presented to a person before implementation.

In some implementations, more detailed information about the usage data may be presented to a person. For example, a representation or image of the message embeddings of the usage data may be presented to a person similar to the presentations of the usage data in FIG. 10 and FIG. 11.

In some implementations, the dimension of message embeddings may be much higher than two (e.g., 256) and accordingly it may not be feasible to present the actual message embeddings to a person. To facilitate presentation of the usage data to a person, dimensionality reduction techniques may be used. Any appropriate dimensionality reduction techniques may be used, such as linear discriminant analysis, principal components analysis, non-negative matrix factorization, generalized discriminant analysis, autoencoders, or stochastic neighbor embedding.

Applying dimensionality reduction to the message embeddings may preserve some or most of the relationships of the message embeddings to each other but do so with much smaller dimensional vectors. For example, the message embeddings may be reduced to two or three dimensions for presentation to a person.

A person may view the message embeddings and decide whether to add a new intent, split an existing intent, merge two existing intents, or remove an existing intent. For example, a person may view an image such as FIG. 10 and decide that a new intent should be created for cluster 1010, or a person may view an image such as FIG. 11 and decide to split intent C into two intents based on cluster 1120 and cluster 1130.

A computer application may be created to obtain the input of a person in making changes to the intents. The computer application may present the person with one or more of a proposal to change intents, information about existing and proposed new intents (any of the information described herein), and a reduced dimension presentation of message embeddings from the usage data. Where a proposal is presented, the person may provide an input to confirm, deny, or modify a proposed change to the intents. The person may also enter his own change to the intents based on the presented information (e.g., add a new intent, split an existing intent, merge existing intents, or remove an intent). For example, the person may select one or more message embeddings to be used to create a new intent.

Figure 12:
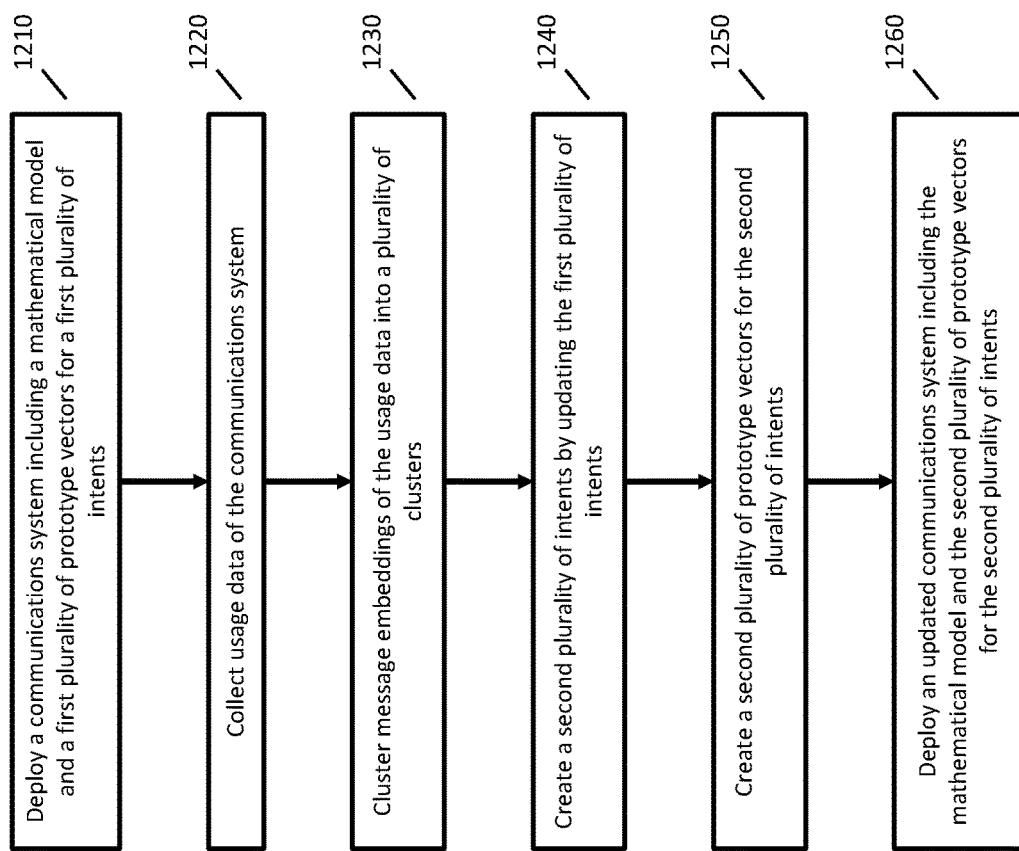
FIG. 12 is an example method for updating intents of a communications system using prototype vectors.

FIG. 12 is a flowchart of an example method for updating intents using usage data from a communications system.

At step 1210, a communications system is deployed where the communications system includes a mathematical model, such as a neural network, and a first plurality of prototype vectors for a first plurality of intents. The communications system may implement any of the techniques described herein. For example, a neural network may process a message received from a user to compute a message embedding that represents the meaning of the message. The communications system may then compare the message embedding with the first plurality of prototype vectors, such as by selecting a prototype vector that is closest to the message embedding. The communications system may then select the intent of the selected prototype vector as corresponding to the meaning of the message.

At step 1220, usage data is collected from the deployed communications system. For example, the usage data may include message embeddings of messages received from users of the communications system.

At step 1230, the message embeddings of the usage data are clustered into a plurality of clusters, such as by using any of the techniques described herein.

At step 1240, a second plurality of intents is created by updating the first plurality of intents. For example, an intent may added, an existing intent may be split into two intents, two existing intents may be merged to a single intent, or an intent may be removed. The process of updating the intents may be performed automatically using any of the techniques described herein, may include automatically creating a proposal to update the intents subject to review by a person, or may involve presenting information about the usage data to a person and receiving input from the person to update the intents.

At step 1250, a second plurality of prototype vectors are created for the second plurality of intents. For example, where an intent is added, a new prototype vector may be created for the new intent by combining (e.g., averaging) message embeddings of messages corresponding to the new intent. Where an existing intent is split, the prototype vector for the existing intent may be removed and new prototype vectors may be created for the new intents resulting from the split. Where two existing intents are merged, the prototype vectors for the existing intents may be removed, and a new prototype vector may be created from the combined message embeddings of the two existing intents. Where an existing intent is removed, the prototype vector for the existing intent may be removed.

In many instances, many or even most of the second plurality of prototype vectors may be present in the first plurality of prototype vectors. Where the first set of prototype vectors was generally chosen accurately, the differences between the first and second plurality of prototype vectors may be small. For example, the second plurality of prototype vectors may include a majority (or a higher fraction such as $2/3$, $3/4$, or more) of the prototype vectors from the first plurality of prototype vectors.

At step 1260, an updated communications system is deployed using the mathematical model and the second plurality of prototype vectors. Note that the mathematical model deployed at step 1260 is the same mathematical model that was deployed at step 1210. One advantage of the processing of FIG. 12 is that the set of intents for a communications system may be updated without retraining or updating the mathematical model used by the communications system. Reusing the same mathematical model may provide significant savings in time and expense over training a new mathematical model (e.g., the computational costs of processing training data and training a new mathematical mode, the cost of actual deployment of a new mathematical model, the risk of and possible actual downtime from deploying a new mathematical model, and a longer time needed period for deployment of an updated communications system).

The process of FIG. 12 may be repeated any number of times. For example, the process may be performed regularly, such as once a week or once a month. In some instances, the processing of FIG. 12 may result in an updated set of intents, and in some instances, no changes to the set of intents may be made.

In some instances, it may be decided to also retrain the mathematical model of the communications system. For example, where a large number of changes are made to the set of intents, a prototype vector for a new intent is too close to a prototype vector of an existing intent, or the mathematical model has not been updated for longer than a threshold period of time (e.g., a month or a quarter), then it may be decided to train a new mathematical model and redeploy the communications system with the new mathematical model.

Implementation

Figure 13:
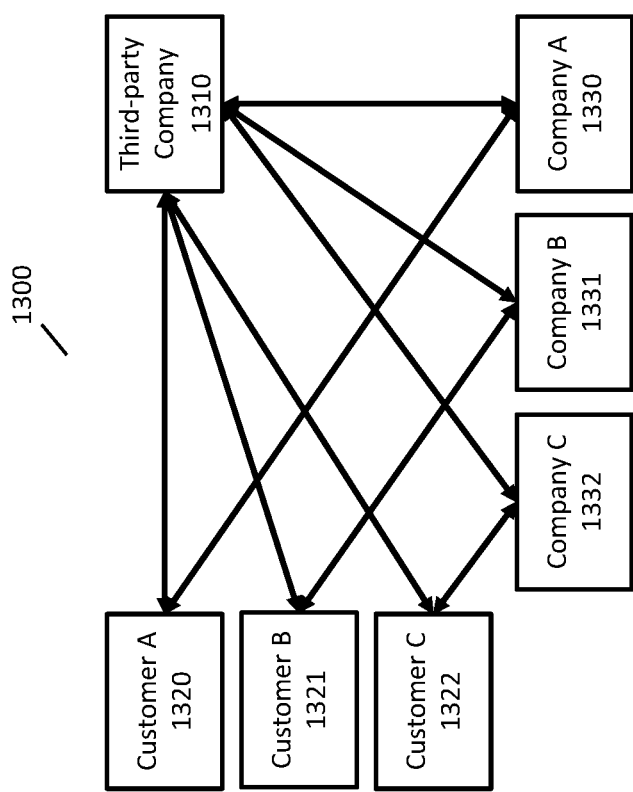
FIG. 13 is an example system for a third-party company to provide services to other companies.

In some implementations, a third-party company may provide services to other companies relating to any of the techniques described herein. For example, a company may provide a messaging application for use by its customers, and the company may use services of the third-party company to process messages received from a customer using a mathematical model and prototype vectors. A company may find it more cost effective to use the services of the third-party company than to implement its own services. FIG. 13 illustrates an example architecture that may be used by a company to obtain assistance from a third-party company in communicating with its customers.

FIG. 13 illustrates a system 1300 that allows third-party company 1310 to provide services to multiple companies. In FIG. 13, third-party company 1310 is providing services to company A 1330, company B 1331, and company C 1332. Third-party company 1310 may provide services to any number of companies.

Customers of each company may communicate with a company where the support process uses the services of third-party company 1310. For example, customer A 1320 may be seeking support from company A 1330, customer B 1321 may be seeking support from company B 1331, and customer C 1322 may be seeking support from company C 1332. It may or may not be apparent to the customers whether they are using services of third-party company 1310.

Third-party company 1310 may assist a company in a variety of ways. In some implementations, third-party company 1310 may assist in connecting a customer with a customer service representative working on behalf of the company. For example, third-party company 1310 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 1310, customers, and companies may be architected in a variety of ways. In some implementations, all communications between a customer and a company may be via third-party company 1310 and there may not be any direct connection between the customer and the company. In some implementations, third-party company 1310 may communicate with the company but may not communicate directly with the customer. In some implementations, a customer may communicate directly with the company and also third-party company 1310.

Where a customer is connected to both a company and third-party company 1310, each of the two connections may be used for different kinds of requests. For example, where the customer is interacting with the company in a way that does not require the services of third-party company 1310 (e.g., navigating a web site of the company), the customer may use the network connection with the company. Where the customer is interacting with the company in a way that uses the services of third-party company 1310, the customer may use the network connection with third-party company. It may not be apparent to the customer whether the customer is using a network connection with the company or with third-party company 1310.

Figure 14:
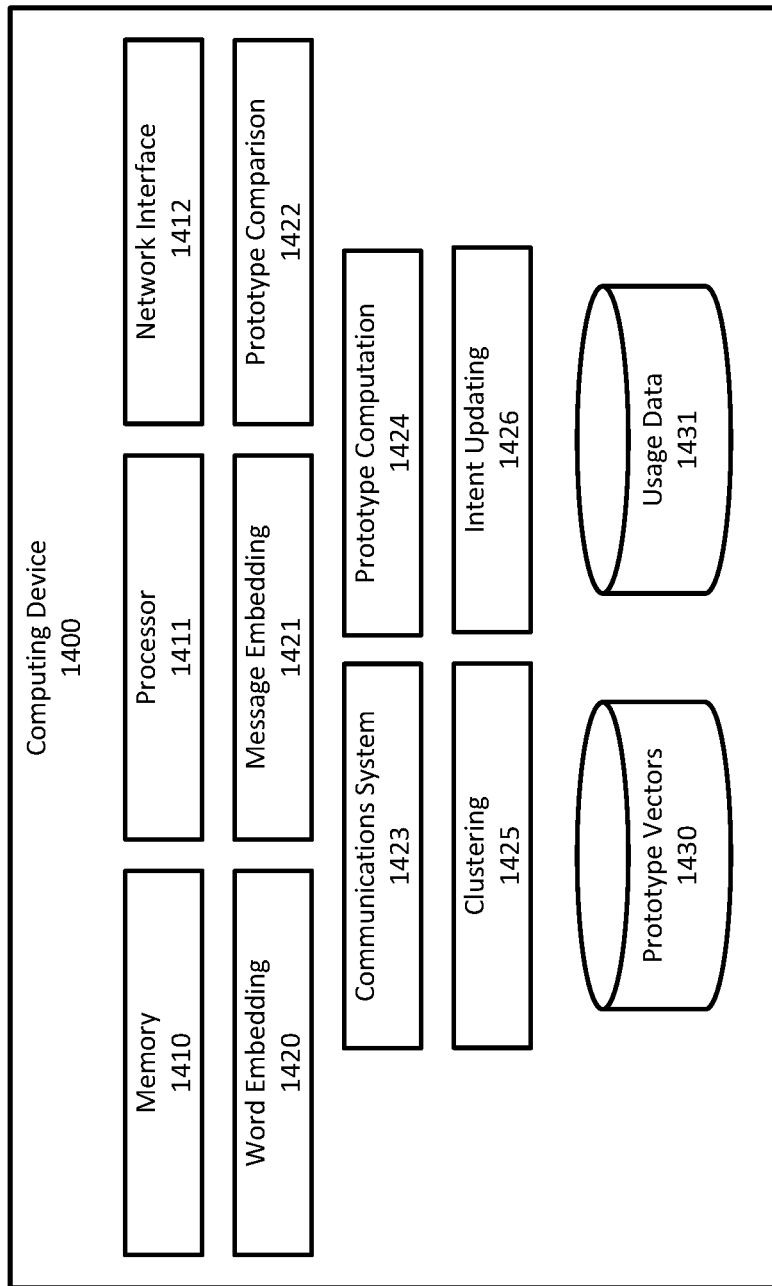
FIG. 14 is an exemplary computing device that may be used to implement a communications system using prototype vectors.

FIG. 14 illustrates components of one implementation of a computing device 1400 for implementing any of the techniques described above. In FIG. 14, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1400 may include any components typical of a computing device, such as volatile or nonvolatile memory 1410, one or more processors 1411, and one or more network interfaces 1412. Computing device 1400 may also include any input and output components, such as displays, keyboards, and touch screens. Computing device 1400 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1400 may have a word embedding component 1420 that may compute word embeddings or obtain previously-computed word embeddings using any of the techniques described herein. Computing device 1400 may have message embedding component 1421 that may compute a message embedding by processing a message using any of the techniques described herein. Computing device 1400 may have a prototype comparison component 1422 that may compare a message embedding to a set of prototype vectors using any of the techniques described herein. Computing device 1400 may have a communications system component 1423 that may implement any techniques for exchanging messages with users. Computing device 1400 may have a prototype computation component 1424 that may compute a prototype vector for an intent using any of the techniques described herein. Computing device 1400 may have a clustering component 1425 that may cluster message embeddings using any of the techniques described herein. Computing device 1400 may have an intent updating component 1426 that may update a set of intents using any of the techniques described herein.

Computing device 1400 may include or have access to various data stores. Data stores may use any known storage technology such as files, relational databases, non-relational databases, or any non-transitory computer-readable media. Computing device 1400 may have prototype vectors data store 1430 that may be used to store prototype vectors for use by a communications system. Computing device 1400 may have usage data store 1431 that may store usage data for updating a set of intents and corresponding prototype vectors.

The techniques described herein provide a number of improvements over existing techniques. For example, use of a prototype classifier reduces computational requirements, improves accuracy in determining an intent, and provides greater flexibility in modifying or adding intents. In another example, the techniques described herein allow for a single classifier to be implemented for a large number of intents and also allow for reduced requirements in the amount of training data needed for individual intents. In another example, the techniques described herein allow a prototype classifier to be used with a communications system with states or a graph of states to improve the efficiency and flexibility of the communications system. In another example, the techniques described herein allow for updating of intents, including adding, merging, splitting, or reorganizing intents, without retraining or updating of a mathematical model of the classifier. In another example, the techniques described herein allow incremental updating of intents without retraining the mathematical model but also allow for retraining of the mathematical model when desired or needed to further improve the classifier. In another example, the techniques described herein allow updating of intents, such as by presenting a user with intent change proposals, contextual information (such as a reduced dimensionality presentation of message embeddings), or descriptions of proposed changes. In another example, the techniques described herein allow updating intents by providing a convenient user interface for the user to select or change message clusters in response to a visual representation of one or more intents. In another example, the techniques described herein allow for control over updating intents by providing a user with an interface including rules or thresholds to allow the user to indicate when proposed intent changes should be implemented automatically, and when proposed intent changes should be presented to a user before implementation. In another example, the techniques described herein provide improvements to a communication system using intent classification that can be implemented with fewer computing resources and with lower costs such as reduced downtime or reduced delays in implementation of improvements. In another example, the techniques described herein improve customer interactions with a communication system since the communications system may be updated more frequently and be more accurate in identifying intents of messages received from customers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for updating intents of a communications system, the method comprising:
    deploying the communications system, comprising a neural network and a first plurality of prototype vectors for communicating with users, wherein:
        each prototype vector corresponds an intent of a first plurality of intents, and
        the communications system is configured to (i) process a message with the neural network to compute a message embedding that represents a meaning of the message and (ii) determine an intent of the message by comparing the message embedding with one or more of the first plurality of prototype vectors;
    collecting usage data from the deployed communications system, wherein the usage data comprises a plurality of message embeddings computed by processing messages from users with the neural network;
    clustering the plurality of message embeddings into a plurality of clusters;
    determining to create a new intent using a first cluster of the plurality of clusters;
    computing a new prototype vector for the new intent by combining message embeddings of the first cluster; and
    deploying an updated communications system using the neural network and a second plurality of prototype vectors, wherein the second plurality of prototype vectors comprises at least a majority of the first plurality of prototype vectors and the new prototype vector.

2. The computer-implemented method of claim 1, wherein determining to create the new intent comprises:
    processing the plurality of clusters to determine that (i) the first cluster is at least a threshold distance from each prototype vector of the first plurality of prototype vectors, and (ii) a density of the first cluster exceeds a density threshold.

3. The computer-implemented method of claim 2, wherein the density of the first cluster is computed using an average distance of the message embeddings to a center of the first cluster.

4. The computer-implemented method of claim 1, wherein computing the new prototype vector comprises computing an average of message embeddings of the first cluster.

5. The computer-implemented method of claim 1, wherein determining to create the new intent comprises:
    processing the plurality of clusters to determine to create the new intent by splitting a first intent of the first plurality of intents into the new intent and a second new intent.

6. The computer-implemented method of claim 5, wherein processing the plurality of clusters to determine to create the new intent comprises:
    determining that the first cluster is within a threshold distance of a first prototype vector of the first intent;
    determining that a second cluster is within the threshold distance of the first prototype vector;
    computing a second new prototype vector for the second new intent by combining message embeddings of the second cluster; and
    wherein the second plurality of prototype vectors comprises the second new prototype vector.

7. The computer-implemented method of claim 1, comprising determining to merge a second intent and a third intent into a fourth intent, wherein the second plurality of prototype vectors comprises a fourth prototype vector for the fourth intent, does not comprise a second prototype vector for the second intent, and does not comprise a third prototype vector for the third intent.

8. The computer-implemented method of claim 7, comprising:
    determining that a second cluster is within a threshold distance of the second prototype vector; and
    determining that the second cluster is within the threshold distance of the third prototype vector.

9. A system for updating intents of a communications system, the system comprising:
    at least one server computer comprising at least one processor and at least one memory, the at least one server computer configured to:
        deploy the communications system, comprising a neural network and a first plurality of prototype vectors for communicating with users, wherein:
            each prototype vector corresponds an intent of a first plurality of intents, and
            the communications system is configured to (i) process a message with the neural network to compute a message embedding that represents a meaning of the message and (ii) determine an intent of the message by comparing the message embedding with one or more of the first plurality of prototype vectors;

collect usage data from the deployed communications system, wherein the usage data comprises a plurality of message embeddings computed by processing messages from users with the neural network;

cluster the plurality of message embeddings into a plurality of clusters;

determine to create a new intent using a first cluster of the plurality of clusters;

compute a new prototype vector for the new intent by combining message embeddings of the first cluster; and deploy an updated communications system using the neural network and a second plurality of prototype vectors, wherein the second plurality of prototype vectors comprises at least a majority of the first plurality of prototype vectors and the new prototype vector.

10. The system of claim 9, wherein the system is implemented by a company for providing customer support to its customers.

11. The system of claim 9, wherein the system is implemented by a third-party company for providing customer support to customers of a company.

12. The system of claim 9, wherein the at least one server computer is configured to determine to create the new intent by:

presenting a representation of the usage data to a person; and receiving an input from the person to create the new intent using the first cluster.

13. The system of claim 12, wherein presenting the representation of the usage data to the person comprises:

computing a second plurality of message embeddings from the plurality of message embeddings, where a dimension of the second plurality of message embeddings is smaller than a dimension of the plurality of message embeddings; and presenting the second plurality of message embeddings to the person.

14. The system of claim 13, wherein computing the second plurality of message embeddings comprises using stochastic neighbor embedding.

15. The system of claim 9, wherein the at least one server computer is configured to compute the new prototype vector by computing an average of message embeddings of the first cluster.

16. The system of claim 9, wherein the at least one server computer is configured to:

receive an input from a user to create a second new intent using one or more example messages corresponding to the second new intent;

compute a second new prototype vector for the second new intent by combining message embeddings of the one or more example messages; and wherein the second plurality of prototype vectors comprises the second new prototype vector.

17. The system of claim 9, wherein the at least one server computer is configured to:

train a second neural network;

compute a third plurality of prototype vectors using message embeddings computed using the second neural network; and deploy the second neural network and the third plurality of prototype vectors for communicating with the users.

18. One or more non-transitory, computer-readable media comprising computer-executable instructions that, when executed, cause at least one processor to perform actions comprising:

deploying a communications system, comprising a neural network and a first plurality of prototype vectors for communicating with users, wherein:

each prototype vector corresponds an intent of a first plurality of intents, and the communications system is configured to (i) process a message with the neural network to compute a message embedding that represents a meaning of the message and (ii) determine an intent of the message by comparing the message embedding with one or more of the first plurality of prototype vectors;

collecting usage data from the deployed communications system, wherein the usage data comprises a plurality of message embeddings computed by processing messages from users with the neural network;

clustering the plurality of message embeddings into a plurality of clusters;

determining to create a new intent using a first cluster of the plurality of clusters;

computing a new prototype vector for the new intent by combining message embeddings of the first cluster; and deploying an updated communications system using the neural network and a second plurality of prototype vectors, wherein the second plurality of prototype vectors comprises at least a majority of the first plurality of prototype vectors and the new prototype vector.

19. The one or more non-transitory, computer-readable media of claim 18, wherein the actions comprise determining to discard a second intent, wherein the second plurality of prototype vectors does not comprise a prototype vector for the second intent.

20. The one or more non-transitory, computer-readable media of claim 19, wherein the actions comprise:

determining a number of message embeddings from the usage data classified as corresponding to the second intent; and comparing the number of message embeddings to a threshold.

* * * * *